(12) United States Patent
Oi et al.

(10) Patent No.: US 12,087,172 B2
(45) Date of Patent: Sep. 10, 2024

(54) IMAGE PROCESSING DEVICE AND IMAGE PROCESSING METHOD

(71) Applicant: SONY GROUP CORPORATION, Tokyo (JP)

(72) Inventors: Kenichiro Oi, Tokyo (JP); Takahide Otani, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/756,180

(22) PCT Filed: Oct. 21, 2020

(86) PCT No.: PCT/JP2020/039509
§ 371 (c)(1),
(2) Date: May 18, 2022

(87) PCT Pub. No.: WO2021/106436
PCT Pub. Date: Jun. 3, 2021

(65) Prior Publication Data
US 2022/0415193 A1 Dec. 29, 2022

(30) Foreign Application Priority Data

Nov. 28, 2019 (JP) .................................. 2019-214975

(51) Int. Cl.
G06T 7/70 (2017.01)
G06T 11/20 (2006.01)
(Continued)

(52) U.S. Cl.
CPC .............. *G08G 5/0082* (2013.01); *G06T 7/70* (2017.01); *G06T 11/203* (2013.01); *H04N 5/272* (2013.01); *G06T 2207/30244* (2013.01)

(58) Field of Classification Search
CPC ....... G06T 11/001; G06T 7/70; G06T 11/203; G06T 2207/30244; G09G 5/377;
(Continued)

(56) References Cited

U.S. PATENT DOCUMENTS 9,892,516 B2 * 2/2018 Moteki ................... G06T 7/579
2013/0338915 A1 * 12/2013 Mizuochi ............. G01C 25/005
701/500
(Continued)

FOREIGN PATENT DOCUMENTS

CA 2994508 A1 * 2/2017 ........... G05D 1/0094
CN 110174903 A 8/2019
(Continued)

OTHER PUBLICATIONS

Translation of JP2019032234 (specification only). Accessed via J-Plat-Pat. https://www.j-platpat.inpit.go.jp/. on Oct. 24, 2023. (Year: 2019).*

(Continued)

*Primary Examiner* — Antonio A Caschera
(74) *Attorney, Agent, or Firm* — CHIP LAW GROUP

(57) ABSTRACT

A configuration capable of accurately displaying a flight path of a drone on an actually captured image of the drone. The configuration includes a data processing unit that displays a moving path of a moving device such as a drone on a display unit that displays a camera-capturing image of the moving device. The data processing unit generates a coordinate conversion matrix for performing coordinate conversion processing of converting position information according to a first coordinate system, for example, the NED coordinate system indicating the moving path of the moving device into a second coordinate system, for example, the camera coordinate system capable of specifying a pixel position of a display image on the display unit. The data (Continued)

processing unit outputs the moving path having position information according to the camera coordinate system generated by coordinate conversion processing to which the generated coordinate conversion matrix is applied.

11 Claims, 24 Drawing Sheets

(51) Int. Cl.
*G08G 5/00* (2006.01)
*H04N 5/272* (2006.01)

(58) Field of Classification Search
CPC .. G09G 2340/12; G08G 5/0082; H04N 5/272; G06V 20/17
See application file for complete search history.

(56) References Cited

U.S. PATENT DOCUMENTS

| 2017/0201617 | A1 | 7/2017 | So |
| 2019/0011912 | A1* | 1/2019 | Lockwood ........... G05D 1/0027 |
| 2020/0167603 | A1* | 5/2020 | Ung .................... G06F 18/2148 |

FOREIGN PATENT DOCUMENTS

| JP | 2005-233712 A | 9/2005 |
| JP | 2008501955 A | 1/2008 |
| JP | 2012-194175 A | 10/2012 |
| JP | 5192598 B1 | 5/2013 |
| JP | 2013218459 A | 10/2013 |
| JP | 2017-116339 A | 6/2017 |
| JP | 2019-032234 A | 2/2019 |
| JP | 2019106000 A | 6/2019 |
| JP | 2019133450 A | 8/2019 |
| WO | 2012/118232 A1 | 9/2012 |
| WO | WO-2018043299 A | 3/2018 |

OTHER PUBLICATIONS

International Search Report and Written Opinion of PCT Application No. PCT/JP2020/039509, issued on Jan. 26, 2021, 09 pages of ISRWO.

* cited by examiner

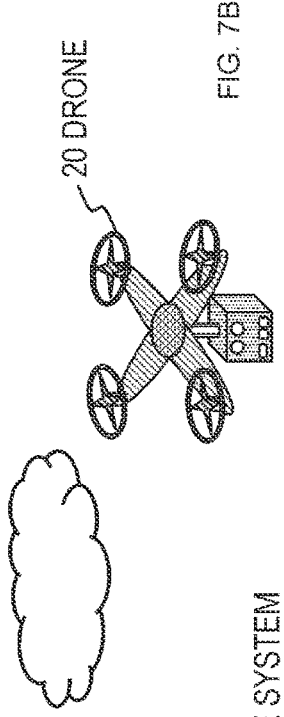
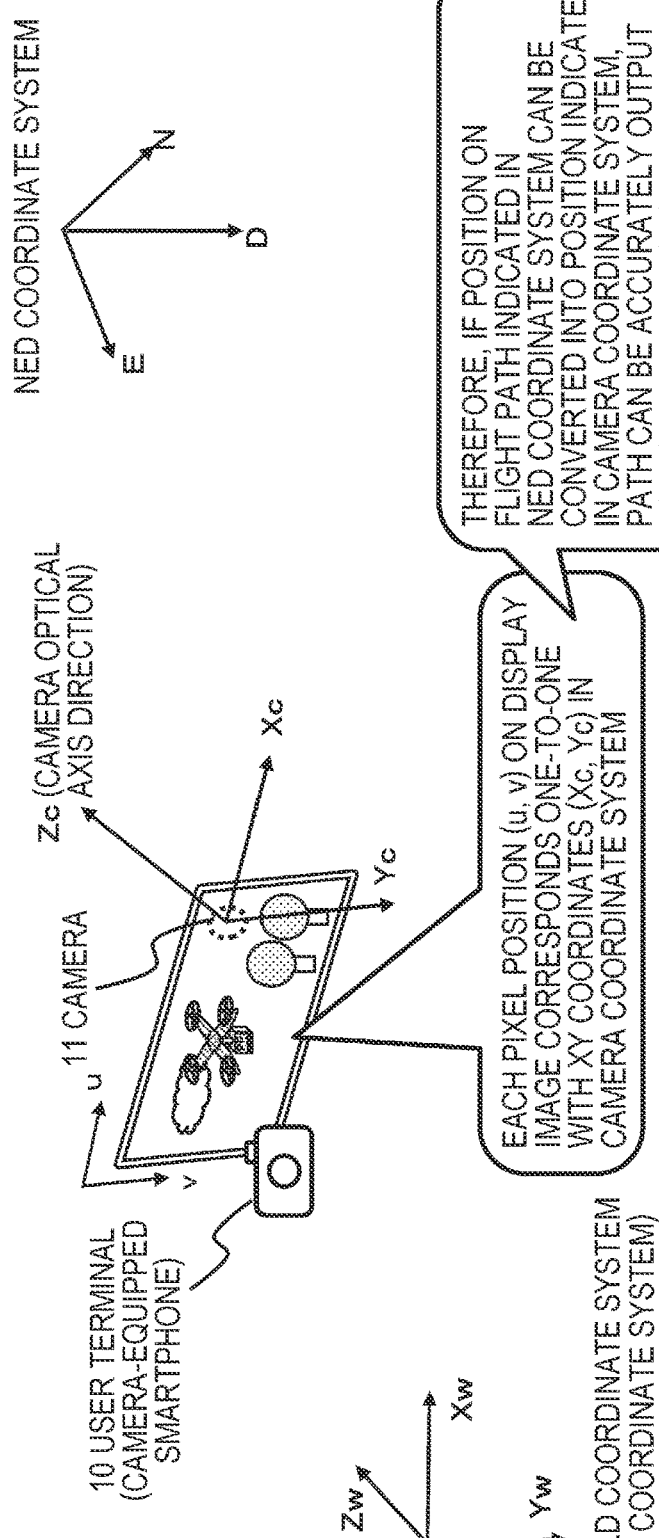
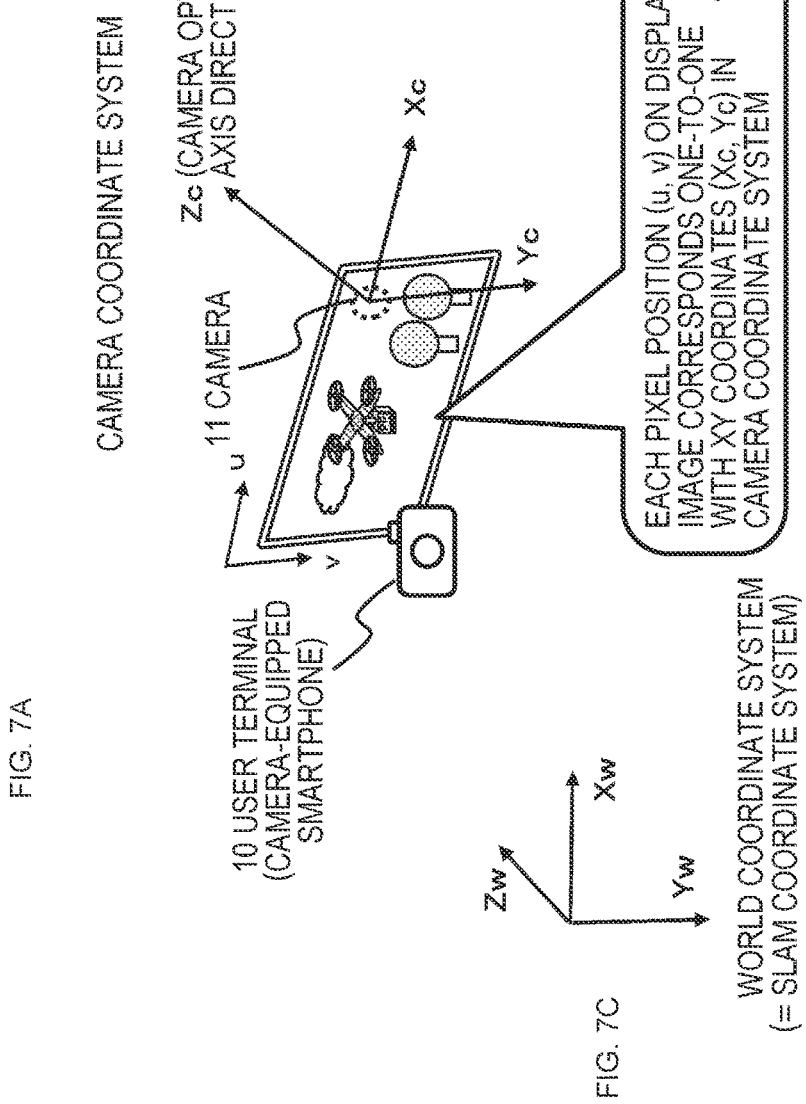

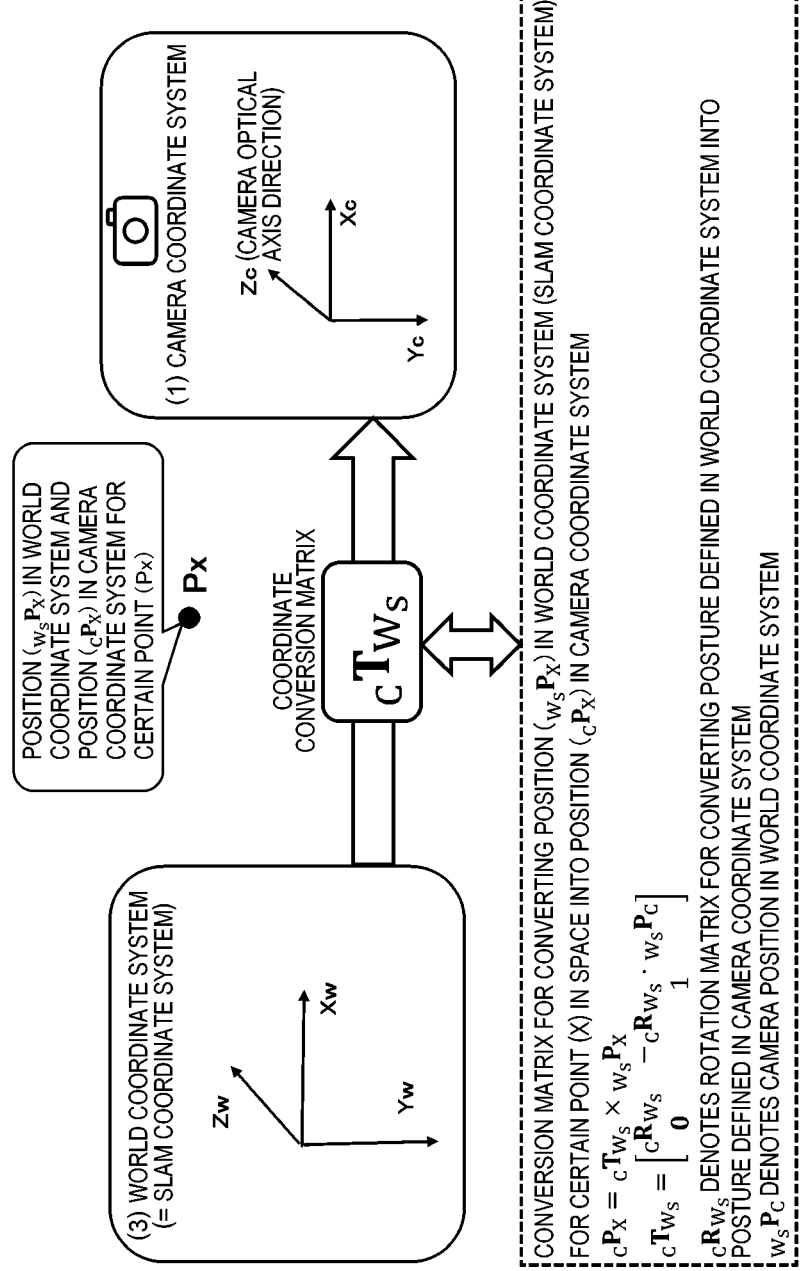

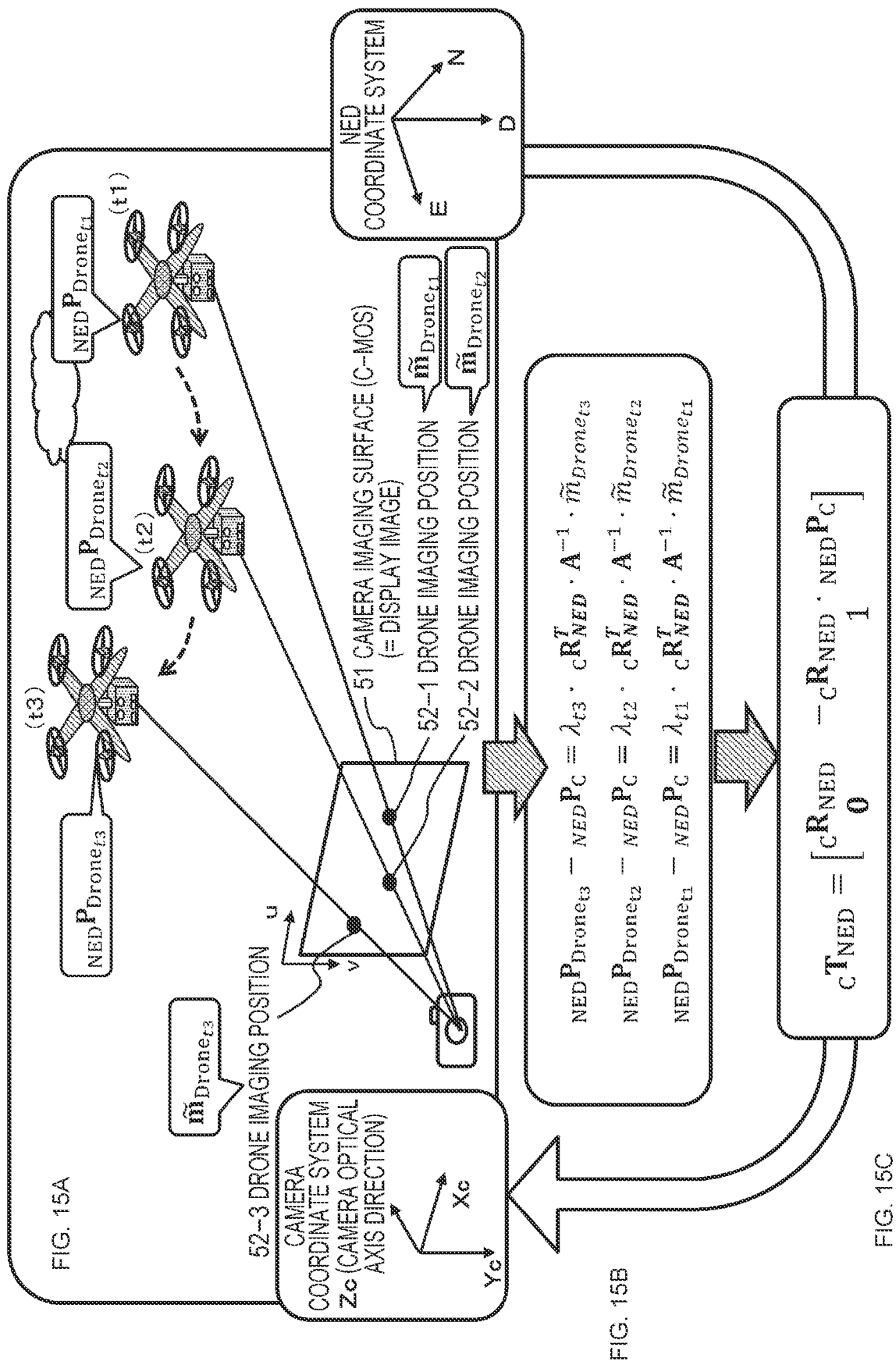

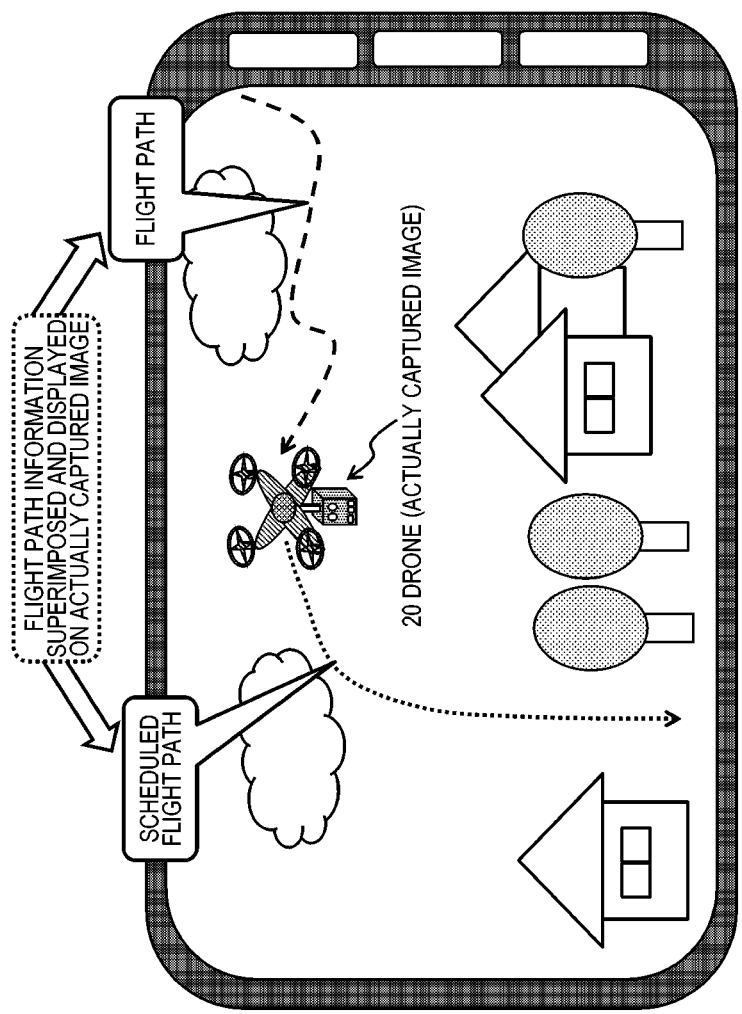

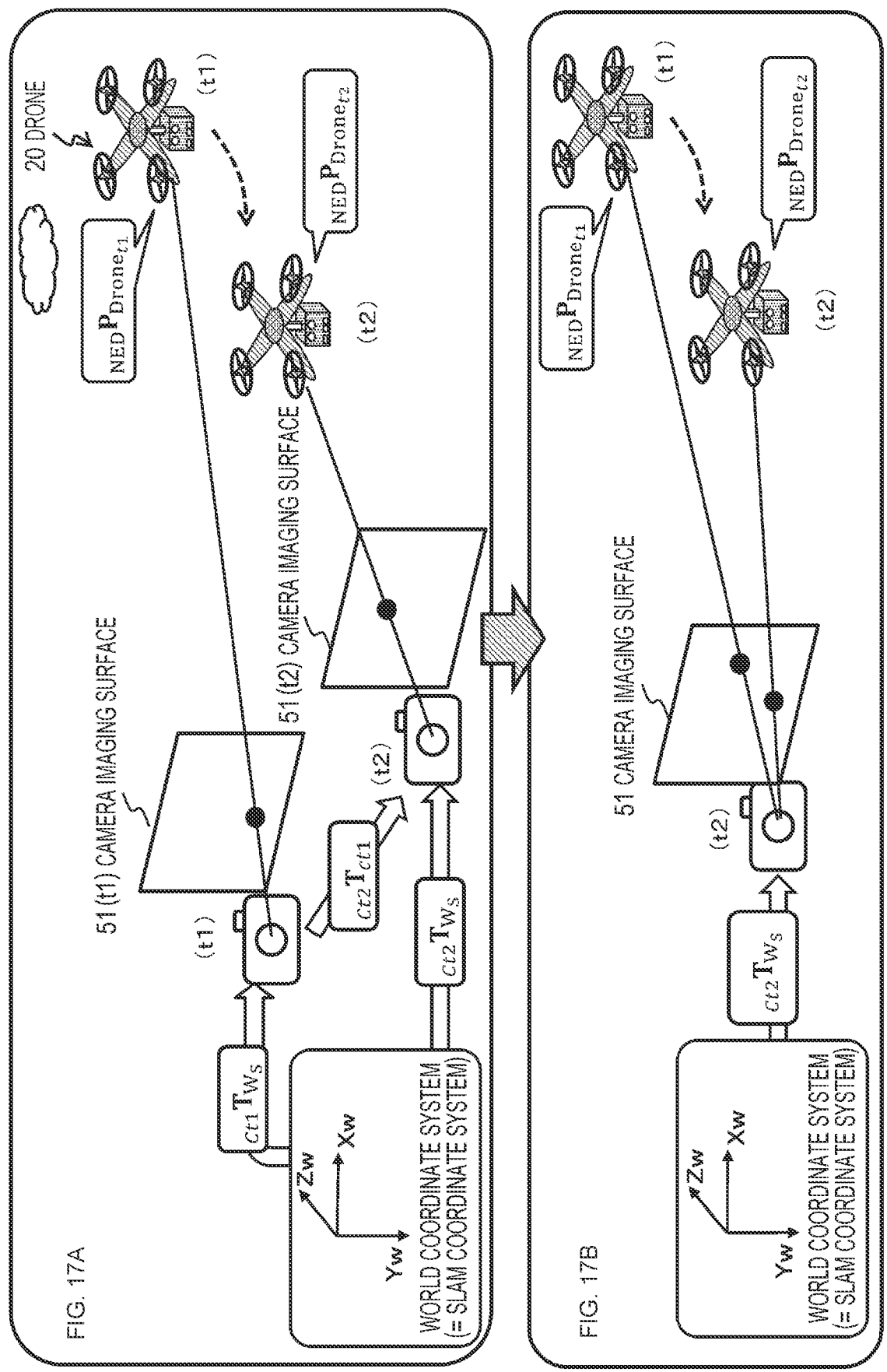

FIG. 20

| (1) TIME (t) | (2) DRONE IMAGING POSITION IN CAMERA COORDINATE SYSTEM | (3) DRONE POSITION IN NED COORDINATE SYSTEM | (4) COORDINATE CONVERSION MATRIX FOR CONVERTING WORLD COORDINATE SYSTEM (SLAM COORDINATE SYSTEM) INTO CAMERA COORDINATE SYSTEM |
|---|---|---|---|
| $t(n)$ | $\tilde{m}_{Dronet(n)}$ | $_{NED}P_{Dronet(n)}$ | $_{Ct(n)}T_{Ws}$ |
| $t(n+1)$ | $\tilde{m}_{Dronet(n+1)}$ | $_{NED}P_{Dronet(n+1)}$ | $_{Ct(n+1)}T_{Ws}$ |
| $t(n+2)$ | $\tilde{m}_{Dronet(n+2)}$ | $_{NED}P_{Dronet(n+2)}$ | $_{Ct(n+2)}T_{Ws}$ |

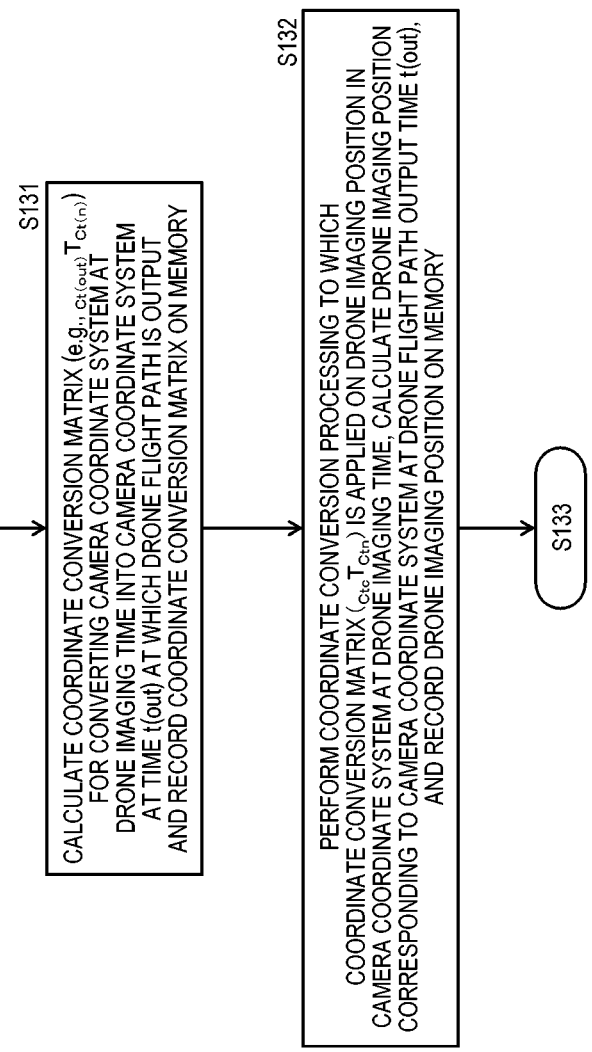

FIG. 22

| (1) TIME (t) | (2) DRONE IMAGING POSITION IN CAMERA COORDINATE SYSTEM | (3) DRONE POSITION IN NED COORDINATE SYSTEM | (4) COORDINATE CONVERSION MATRIX FOR CONVERTING WORLD COORDINATE SYSTEM (SLAM COORDINATE SYSTEM) INTO CAMERA COORDINATE SYSTEM | (5) COORDINATE CONVERSION MATRIX FOR CONVERTING CAMERA COORDINATE SYSTEM AT TIME OF IMAGING DRONE INTO CAMERA COORDINATE SYSTEM AT TIME OF OUTPUTTING FLIGHT PATH | (6) DRONE IMAGING POSITION CORRESPONDING TO CAMERA COORDINATE SYSTEM AT DRONE FLIGHT PATH OUTPUT TIME t(out) |
|---|---|---|---|---|---|
| t(n) | $\tilde{m}_{Dronet(n)}$ | $^{NED}P_{Dronet(n)}$ | $^{Ct(n)}T_{Ws}$ | $^{Ct(out)}T_{Ct(n)}$ | $\lambda \cdot \tilde{m}_{Dronet_n} = A \cdot {}^{C_{t_{out}}}T_{NED} \cdot {}^{NED}P_{Dronet_n}$ |
| t(n+1) | $\tilde{m}_{Dronet(n+1)}$ | $^{NED}P_{Dronet(n+1)}$ | $^{Ct(n+1)}T_{Ws}$ | $^{Ct(out)}T_{Ct(n+1)}$ | $\lambda \cdot \tilde{m}_{Dronet_{n+1}} = A \cdot {}^{C_{t_{out}}}T_{NED} \cdot {}^{NED}P_{Dronet_{n+1}}$ |
| t(n+2) =t(out) | $\tilde{m}_{Dronet(n+2)} = \tilde{m}_{Dronet(out)}$ | $^{NED}P_{Dronet(n+2)} = {}^{NED}P_{Dronet(out)}$ | $^{Ct(n+2)}T_{Ws} = {}^{Ct(out)}T_{Ws}$ | — | $\tilde{m}_{Dronet(n+2)} = \tilde{m}_{Dronet(out)}$ |

IMAGE PROCESSING DEVICE AND IMAGE PROCESSING METHOD

CROSS REFERENCE TO RELATED APPLICATIONS

This application is a U.S. National Phase of International Patent Application No. PCT/JP2020/039509 filed on Oct. 21, 2020, which claims priority benefit of Japanese Patent Application No. JP 2019-214975 filed in the Japan Patent Office on Nov. 28, 2019. Each of the above-referenced applications is hereby incorporated herein by reference in its entirety.

TECHNICAL FIELD

The present disclosure relates to an image processing device, an image processing method, and a program. More specifically, the present disclosure relates to an image processing device, an image processing method, and a program capable of, for example, accurately displaying a movement trajectory of a moving device such as a drone on an actually captured image.

BACKGROUND ART

In recent years, there has been a rapid increase in the use of drones that are small flight vehicles. For example, drones are provided with a camera and are used for processing of capturing an image of a landscape on the ground from above or other kinds of processing. Further, delivery of packages using drones is also planned, and various experiments have been carried out therefor.

At present, in many countries, it is required to perform flight control of drones by operating a controller under human monitoring, that is, within human sight. However, in the future, many autonomous flying drones that do not require human monitoring, that is, many drones that autonomously fly from a departure point to a destination will be used.

Such autonomous flying drones fly from a departure point to a destination by using, for example, communication information with a control center or GPS position information.

A specific use form of autonomous flying drones is delivery of packages by drones. In a case where a package is delivered by a drone, it is expected that, when the estimated time of arrival of the drone carrying the package addressed to a user who has requested delivery of the package approaches, the user wants to look up the sky to check the drone carrying the package addressed to the user and also check a flight path or scheduled flight path thereof.

Further, it is also expected that, even in a case where a drone is not a drone for delivering packages, there is a demand to check a flight path of the drone flying in the sky for, for example, safety confirmation.

Processing for satisfying such a user request is, for example, processing of capturing an image of the drone in the sky by using a camera of a camera-equipped user terminal such as a smartphone and displaying the captured image on a display unit while superimposing and displaying a flight path and scheduled flight path of the drone on the actually captured image of the drone.

That is, an augmented reality (AR) image in which a line indicating the flight path is superimposed on a real image of the drone is generated and displayed.

Information regarding the flight path and scheduled flight path of the drone can be transmitted from the drone or a control center that manages flight of the drone to the user terminal such as a smartphone by communication via a communication network.

The drone or the control center holds the information regarding the flight path and the scheduled flight path of the drone, that is, flight path information and can provide the flight path information for the user terminal such as a smartphone.

However, many drones perform position control using communication information of a GPS satellite. Position information obtained from the GPS satellite includes latitude information, longitude information, and altitude information. Many drones fly by using the above information and therefore perform position confirmation and flight control according to the NED coordinate system.

The NED coordinate system is a coordinate system in which north, east, and down are set as three axes.

The drone or the control center holds the flight path information that is the information regarding the flight path and scheduled flight path of the drone as path information (N, E, D) to which the NED coordinates are applied, and the path information according to the NED coordinate system is provided for the user terminal such as a smartphone.

Meanwhile, a camera-capturing image displayed on the user terminal such as a smartphone is image data according to the camera coordinate system set in accordance with an imaging direction of the camera.

An image position of the real image of the drone captured by the camera of the user terminal such as a smartphone can be specified as an image position on the camera coordinates. However, it is difficult to calculate which position on the NED coordinates the real image position of the drone corresponds to.

As described above, the position of the drone serving as the real image displayed on the user terminal such as a smartphone can be specified in the camera coordinate system, but the flight path information of the drone received from the drone or the control center is path position information specified in the NED coordinate system. Thus, there is a problem in that it is difficult to confirm which position on the camera coordinates this path position corresponds to.

As a result, in a case where the user terminal such as a smartphone attempts to receive the flight path information of the drone from the drone or the control center and display the flight path on the display unit on the basis of the received information, there arises a problem that an accurate path cannot be displayed.

Note that, for example, Patent Document 1 (Japanese Patent No. 5192598) is a related art that discloses a configuration in which a position and trajectory of an autonomous robot are AR displayed on an image captured by a fixed point camera such as a surveillance camera.

The disclosed configuration is such that an AR tag is attached to the autonomous robot or a work area of the autonomous robot, the AR tag is recognized from a camera-capturing image to generate one piece of reference coordinate information, and the generated reference coordinate information is used to identify a position and a path of the autonomous robot.

However, the configuration requires to attach the AR tag in the work area and, in addition, is only applicable within a limited work area. In a configuration that flies in the sky like a drone, an AR tag cannot be attached in the sky.

CITATION LIST

Patent Document

Patent Document 1: Japanese Patent No. 5192598

SUMMARY OF THE INVENTION

Problems to be Solved by the Invention

The present disclosure has been made in view of the above problems, for example, and an object thereof is to provide an image processing device, an image processing method, and a program capable of displaying a real image of a drone serving as a camera-capturing image on a user terminal such as a smartphone and accurately superimposing and displaying a flight path and scheduled flight path of the drone on the real image.

Solutions to Problems

A first aspect of the present disclosure is
an image processing device including
a data processing unit that displays a moving path of a moving device on a display unit that displays a camera-capturing image of the moving device, in which
the data processing unit
executes coordinate conversion processing of converting position information according to a first coordinate system indicating the moving path of the moving device into a second coordinate system capable of specifying a pixel position of a display image on the display unit, and
outputs, to the display unit, the moving path having position information according to the second coordinate system generated by the coordinate conversion processing.

Further, a second aspect of the present disclosure is
an image processing method executed in an image processing device, in which:
the image processing device includes a data processing unit that displays a moving path of a moving device on a display unit that displays a camera-capturing image of the moving device; and
the data processing unit
executes coordinate conversion processing of converting position information according to a first coordinate system indicating the moving path of the moving device into a second coordinate system capable of specifying a pixel position of a display image on the display unit, and
outputs, to the display unit, the moving path having position information according to the second coordinate system generated by the coordinate conversion processing.

Furthermore, a third aspect of the present disclosure is
a program for causing an image processing device to execute image processing, in which:
the image processing device includes a data processing unit that displays a moving path of a moving device on a display unit that displays a camera-capturing image of the moving device; and
the program causes the data processing unit to execute
coordinate conversion processing of converting position information according to a first coordinate system indicating the moving path of the moving device into a second coordinate system capable of specifying a pixel position of a display image on the display unit, and
processing of outputting, to the display unit, the moving path having position information according to the second coordinate system generated by the coordinate conversion processing.

Note that the program of the present disclosure is, for example, a program that can be provided in a computer-readable format by a storage medium or a communication medium for an information processing device or computer system that can execute various program codes. By providing such a program in a computer-readable format, processing according to the program is realized in the information processing device or computer system.

Other objects, features, and advantages of the present disclosure will be apparent from more detailed description based on embodiments of the present disclosure described later and the accompanying drawings. Note that, in this specification, a system is a logical set configuration of a plurality of devices, and is not limited to a system in which devices having respective configurations are in the same housing.

An embodiment of the present disclosure realizes a configuration capable of accurately displaying a flight path of a drone on an actually captured image of the drone.

Specifically, for example, the configuration includes a data processing unit that displays a moving path of a moving device such as a drone on a display unit that displays a camera-capturing image of the moving device. The data processing unit generates a coordinate conversion matrix for performing coordinate conversion processing of converting position information according to a first coordinate system, for example, the NED coordinate system indicating the moving path of the moving device into a second coordinate system, for example, the camera coordinate system capable of specifying a pixel position of a display image on the display unit and outputs, to the display unit, the moving path having position information according to the camera coordinate system generated by coordinate conversion processing to which the generated coordinate conversion matrix is applied.

This configuration can accurately display a flight path of a drone on an actually captured image of the drone.

Note that the effects described in this specification are merely examples, are not limited, and may have other additional effects.

BRIEF DESCRIPTION OF DRAWINGS

FIGS. 7A, 7B, and 7C illustrate a plurality of coordinate systems used in processing executed by an image processing device of the present disclosure.

FIG. 8 illustrates an example of processing of converting position information in a certain coordinate system into position information in another different coordinate system.

FIGS. 15A, 15B, and 15C illustrate a specific example of processing of calculating a coordinate conversion matrix (CTNED) executed by a user terminal serving as an image processing device of the present disclosure.

FIGS. 17A and 17B illustrate processing in which a change in a position and posture of a camera during an imaging period of a drone at three different positions is considered.

MODE FOR CARRYING OUT THE INVENTION

Hereinafter, details of an image processing device, an image processing method, and a program of the present disclosure will be described with reference to the drawings. Note that description will be made according to the following items.
1. Problem in processing of displaying path information of drone
2. Processing executed by image processing device of present disclosure
3. Sequence of processing executed by image processing device of present disclosure
4. Configuration example of image processing device of present disclosure and drone
5. Summary of configurations of present disclosure

[1. Problem in Processing of Displaying Path Information of Drone]

First, a problem in processing of displaying path information of a drone will be described with reference to FIG. 1 and subsequent drawings.

As described above, at present, in many countries, it is required to perform flight control of drones by operating a controller under human monitoring, that is, within human sight. However, in the future, autonomous flying drones that do not require human monitoring, that is, drones that autonomously fly from a departure point to a destination will be used. Such autonomous flying drones fly from a departure point to a destination by using, for example, communication information with a control center or GPS position information.

A specific use form of autonomous flying drones is delivery of packages by drones. In a case where a package is delivered by a drone, it is expected that, when the estimated time of arrival of the drone carrying the package addressed to a user who has requested delivery of the package approaches, the user wants to look up the sky to check the drone carrying the package addressed to the user and also check a flight path or scheduled flight path thereof.

Processing for satisfying such a user request is, for example, processing in which the user captures an image of the drone in the sky by using a camera of a camera-equipped user terminal such as a smartphone, and the captured image is displayed on a display unit while a flight path and scheduled flight path of the drone is being superimposed and displayed on the image.

A specific example of this processing will be described with reference to FIG. 1 and the subsequent drawings.

Figure 1:
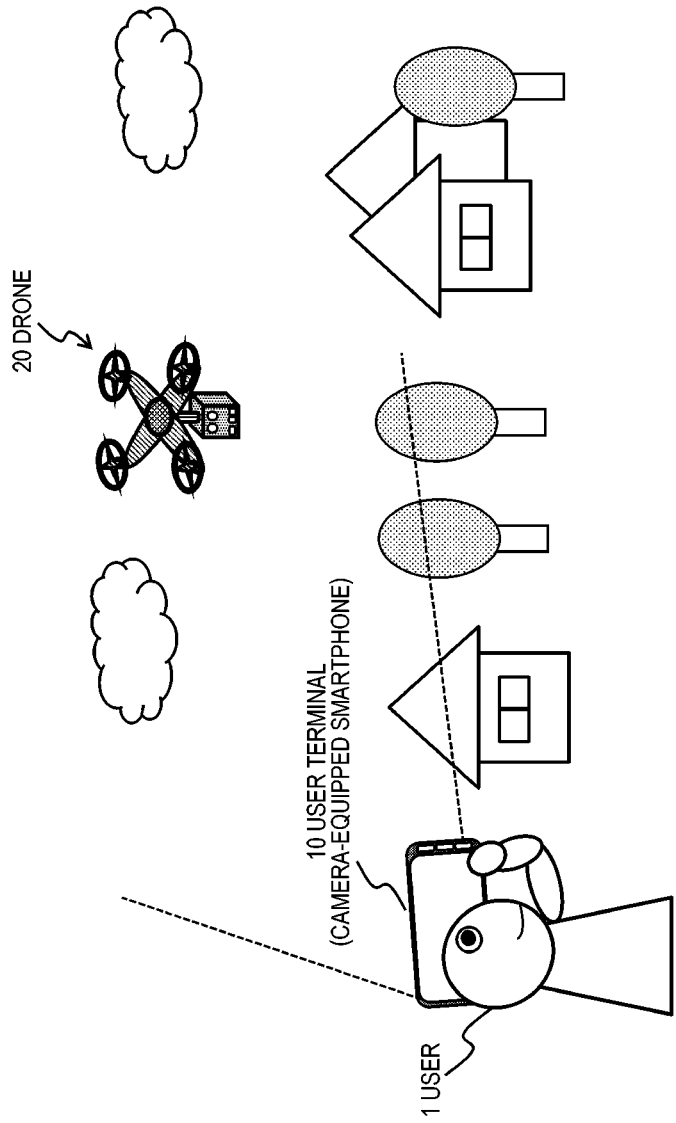
FIG. 1 illustrates an example of processing of capturing an image of a drone using a user terminal and processing of displaying path information on a captured image.

FIG. 1 illustrates a drone 20 flying in the sky and a user 1 holding a user terminal 10 that is a camera-equipped smartphone.

The user 1 directs the camera of the user terminal 10 toward the drone 20 in the sky and captures an image of the drone 20.

Figure 2:
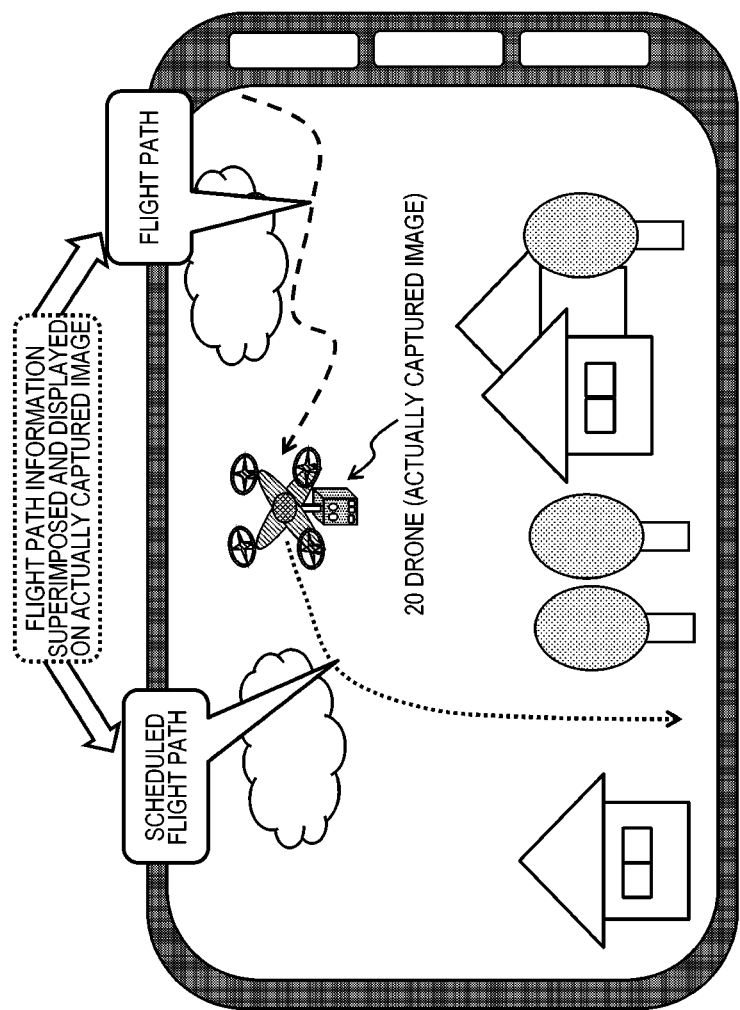
FIG. 2 illustrates a specific example of processing of displaying path information of a drone on a display unit of a user terminal.

FIG. 2 illustrates an example of a display image on the user terminal 10.

The image illustrated in FIG. 2 is an image captured by the camera of the user terminal 10, and the drone 20 is displayed therein. The image of the drone 20 is a real object actually flying in the sky.

Lines indicating a flight path and scheduled flight path of the drone 20 are displayed on this real image as virtual images generated by a data processing unit of the user terminal 10.

That is, an augmented reality (AR) image in which a virtual line indicating the flight path is superimposed on the real image of the drone is generated and displayed.

The "flight path" in FIG. 2 is a flown path along which the drone 20 has flown to a current position. Further, the "scheduled flight path" in FIG. 2 is a scheduled flight path of the drone 20 from the current position.

FIG. 2 illustrates an example where an end of the "flight path" corresponds to the current position of the drone 20, a start point of the "scheduled flight path" also corresponds to the current position of the drone 20, and those pieces of path information are accurately displayed.

It can be seen that the drone 20 plans to fly along the "scheduled flight path" from the current position, land in front of a house, and deliver a package addressed to the user.

The user terminal can receive information regarding the flight path and scheduled flight path of the drone from the drone or a control center.

Figure 3:
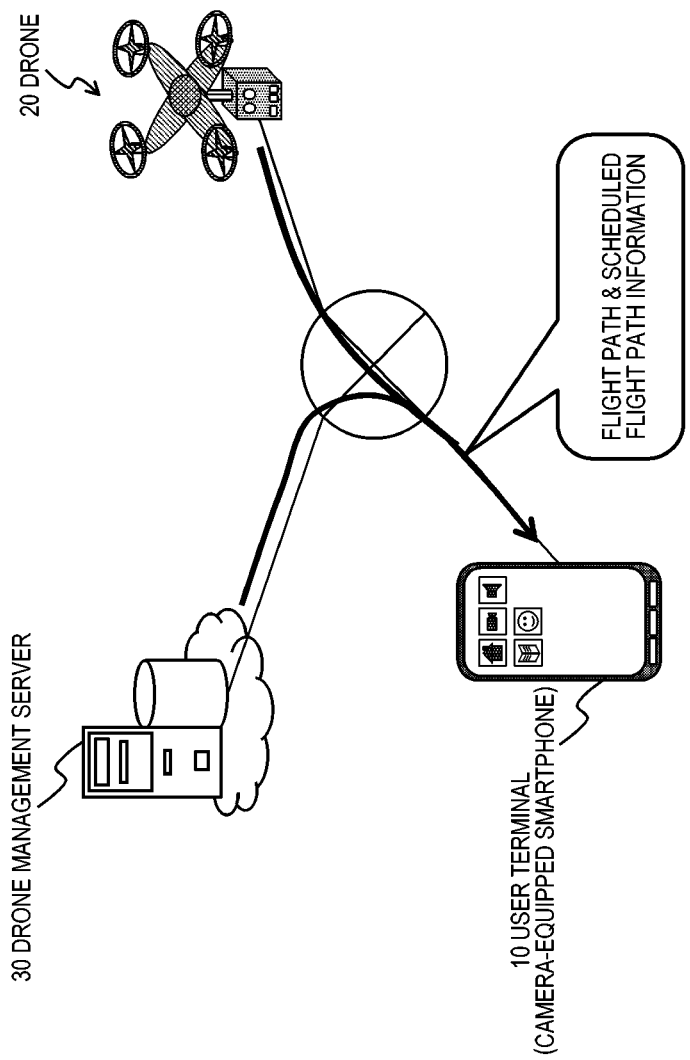
FIG. 3 illustrates an example of transmitting and receiving flight path information that is information regarding a flight path and a scheduled flight path of a drone.

As illustrated in FIG. 3, the user terminal 10 can receive flight path information that is the information regarding the flight path and scheduled flight path of the drone from the drone 20 or a drone management server 30 that is the control center.

However, as described above, many drones perform position control using communication information of a GPS satellite. Position information obtained from the GPS satellite includes latitude information, longitude information, and altitude information. Many drones fly by using the above information and therefore perform position confirmation and control of a flight route by using the NED coordinate system in many cases.

The NED coordinates are coordinates in which north, east, and down are set as three axes.

The drone 20 or the drone management server 30 that is the control center illustrated in FIG. 3 holds the flight path information that is the information regarding the flight path and scheduled flight path of the drone as path information (N, E, D) to which the NED coordinate system is applied, and the path information according to the NED coordinate system is provided for the user terminal 10 such as a smartphone.

Meanwhile, a camera-capturing image displayed on the user terminal 10 such as a smartphone is image data according to the camera coordinate system set in accordance with an imaging direction of the camera.

The data processing unit of the user terminal 10 such as a smartphone can specify an image position of the real image of the drone 20 captured by the camera as an image position on the camera coordinates. However, it is impossible to calculate which position on the NED coordinates the real image position of the drone 20 corresponds to.

As described above, the position of the drone 20 serving as the real image displayed on the user terminal 10 such as a smartphone can be specified in the camera coordinate system, but the flight path information of the drone 20 received from the drone 20 or the drone management server 30 is path position information specified in the NED coordinate system. Thus, it is impossible to accurately analyze which position on the camera coordinates this path position corresponds to.

As a result, in a case where the user terminal 10 such as a smartphone attempts to receive the flight path information of the drone 20 from the drone 20 or the drone management server 30 and display the flight path on the display unit on the basis of this received information, an accurate path cannot be displayed.

Figure 4:
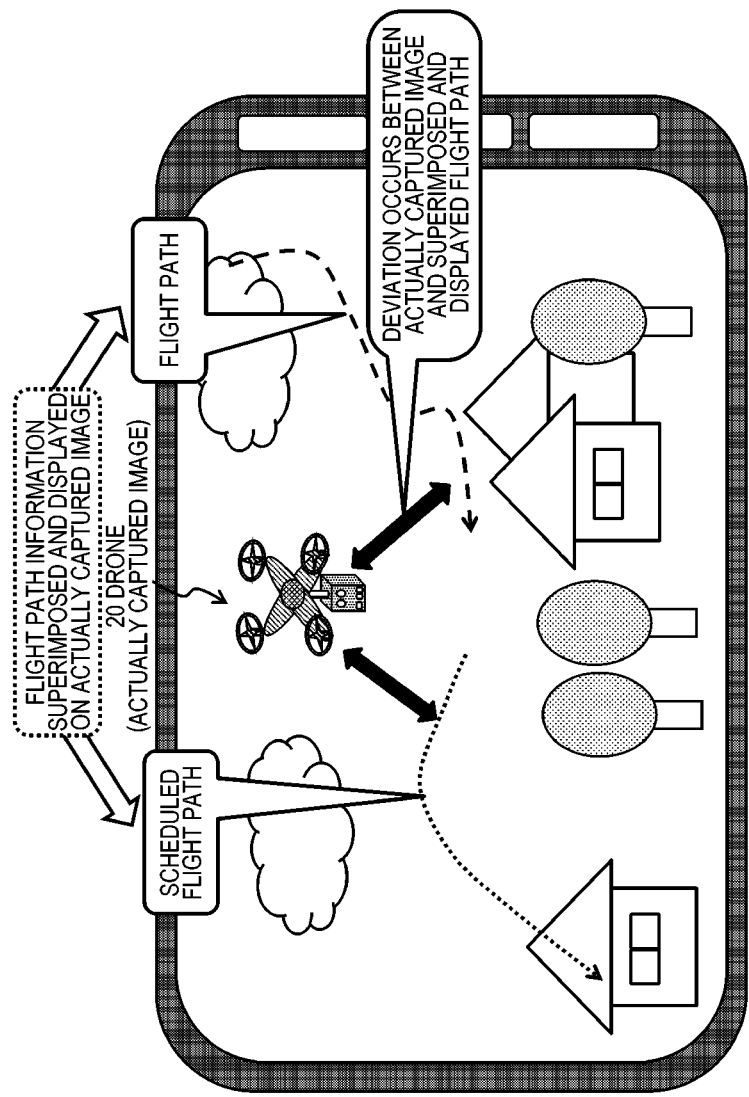
FIG. 4 illustrates a problem in processing of displaying path information of a drone.

For example, as illustrated in FIG. 4, there arises a problem that the "flight path" and the "scheduled flight path" are displayed as a path deviating from the current position of the drone 20.

Figure 5:
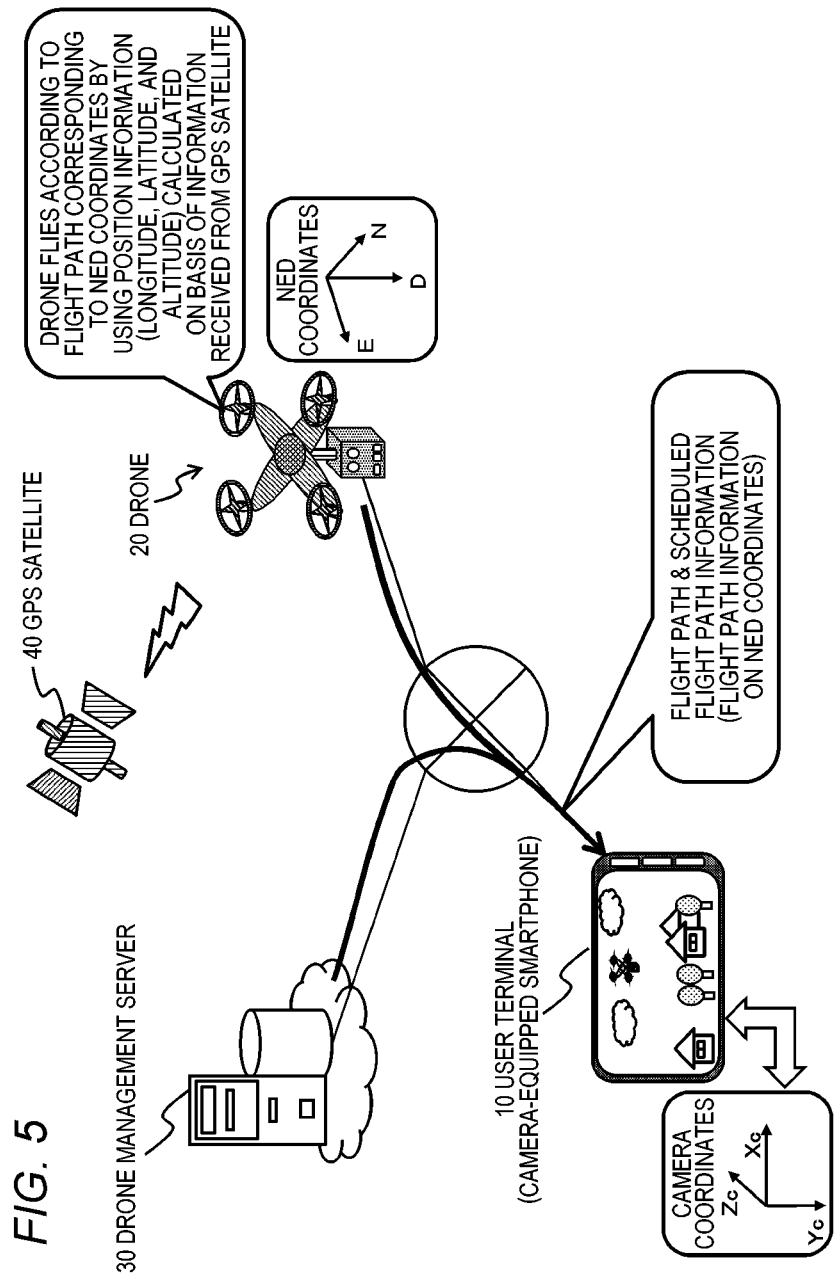
FIG. 5 illustrates a reason why path information of a drone is inaccurately displayed.

This is because, as illustrated in FIG. 5, the camera-capturing image displayed on the user terminal 10 such as a smartphone is image data according to the camera coordinate system set in accordance with the imaging direction of the camera, whereas the flight path information of the drone 20 received from the drone 20 or the drone management server 30 is position information in the NED coordinate system.

Figure 6:
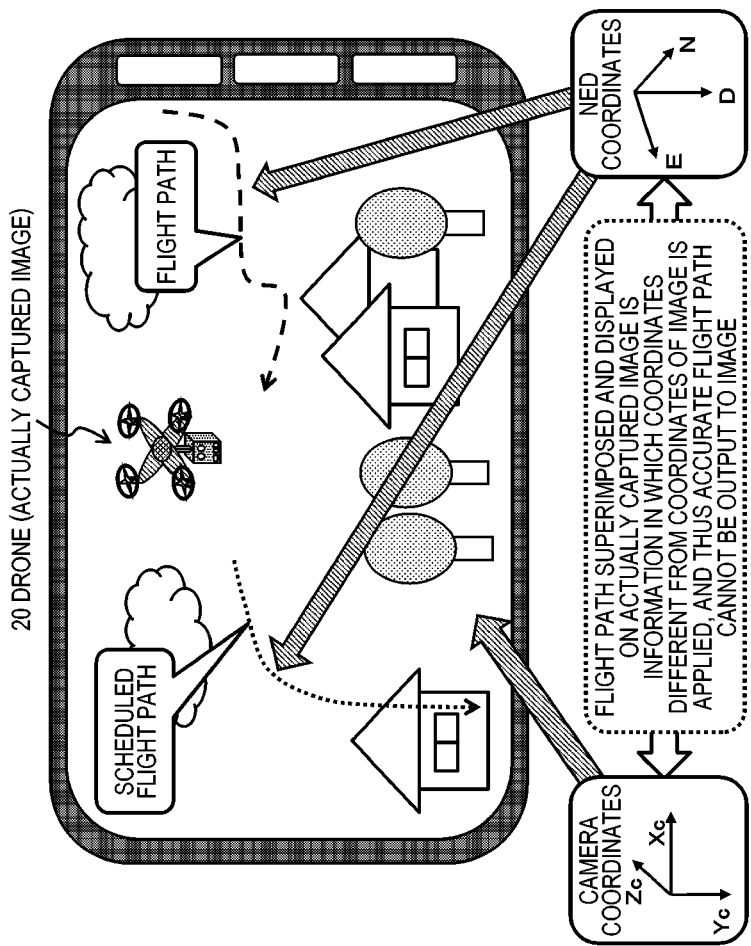
FIG. 6 illustrates a reason why path information of a drone is inaccurately displayed.

As a result, as illustrated in FIG. 6, in a case where the path information according to the NED coordinate system (N, E, D) is attempted to be displayed on the camera-capturing image according to the camera coordinate system (Xc, Yc, Zc), an accurate path position cannot be displayed because a correspondence between the camera coordinate system and the NED coordinate system is unknown.

[2. Processing Executed by Image Processing Device of Present Disclosure]

Next, processing executed by the image processing device of the present disclosure will be described.

The image processing device of the present disclosure is, for example, the user terminal 10 such as a smartphone owned by the user and executes processing of accurately displaying path information of a drone according to the NED coordinate system (N, E, D) on a camera-capturing image according to the camera coordinate system (Xc, Yc, Zc), for example, a captured image of the drone.

The user terminal 10 serving as the image processing device of the present disclosure converts the flight path information of the drone 20 received from the drone 20 or the drone management server 30, that is, a flight path position in the NED coordinate system into position information in the camera coordinate system that is a coordinate system of the camera-capturing image. Thereafter, the user terminal displays, on the camera-capturing image, a line indicating the flight path converted into the position information in the camera coordinate system.

By performing the above processing, it is possible to accurately display the path information of the drone on the captured image of the drone.

First, a plurality of coordinate systems used in the processing executed by the image processing device of the present disclosure will be described with reference to FIGS. 7A, 7B, and 7C.

FIGS. 7A, 7B, and 7C illustrate the following three coordinate systems.

FIG. 7A Camera coordinate system

FIG. 7B NED coordinate system

FIG. 7C World coordinate system (SLAM coordinate system)

FIG. 7A The camera coordinate system is a coordinate system capable of defining an image position (pixel position) of a camera-capturing image of the user terminal 10. The camera coordinate system is a coordinate system in which a focal point of the camera serves as an origin C, an image plane is a two-dimensional plane of Xc and Yc, and an optical axis direction (depth) is Zc. The origin C moves as the camera moves. For example, the camera coordinate system is a coordinate system in which a horizontal axis of an imaging element such as a C-MOS is an Xc axis, a vertical axis thereof is a Yc axis, and the optical axis direction is a Zc axis. A two-dimensional plane (UV plane) of the display unit corresponds to an XcYc plane of the camera coordinates.

FIG. 7B The NED coordinate system indicates a position of the drone 20 and a position on the flight path and is a coordinate system used for flight control of the drone 20.

Many drones 20 perform position control using communication information of a GPS satellite. Position information obtained from the GPS satellite is latitude information, longitude information, and altitude information, and many drones fly by using those pieces of information and thus use the NED coordinate system.

The NED coordinate system is coordinates in which north, east, and down are set as three axes.

The drone 20 or the drone management server 30 such as the control center holds the flight path information that is the information regarding the flight path and scheduled flight path of the drone 20 as the path information (N, E, D) in the NED coordinate system, and the path information according to the NED coordinates is provided for the user terminal 10 such as a smartphone.

FIG. 7C The world coordinate system (SLAM coordinate system) is mainly used as a coordinate system that defines the entire space used for three-dimensional graphics.

In the processing of the present disclosure, the world coordinate system is a coordinate system (SLAM coordinate system) applied to SLAM processing executed by the user terminal 10, that is, simultaneous localization and mapping (SLAM) processing in which localization of a camera position and creation of an environment map (mapping) are executed in parallel.

As described in a lower center part of FIGS. 7A, 7B, and 7C, each pixel position (u, v) on the display image corresponds one-to-one with XY coordinates (Xc, Yc) in the camera coordinate system.

Therefore, if a position on the flight path indicated in the NED coordinate system can be converted into a position indicated in the camera coordinate system, the path can be accurately output to the display image shown in the camera coordinate system.

FIG. 8 illustrates an example of processing of converting position information in a certain coordinate system into position information in another different coordinate system.

The example of FIG. 8 shows a coordinate conversion matrix $_cT_{Ws}$ that is necessary for converting certain position information (Xw, Yw, Zw) in the world coordinate system into position information (Xc, Yc, Zc) in the camera coordinate system.

For one point (X) in a three-dimensional space in an upper center of FIG. 8, a position of the point in the world coordinate system (SLAM coordinate system) and a position of the point in the camera coordinate system are expressed as follows.

The position in the world coordinate system (SLAM coordinate system): $_{Ws}P_x$ The position in the camera coordinate system: $_cP_X$ Here, a coordinate conversion matrix for converting the position ($_{Ws}P_X$) in the world coordinate system (SLAM coordinate system) for the one point (x) in the three-dimensional space into the position ($_cP_X$) in the camera coordinate system is defined as $_cT_{Ws}$.

As shown in a lower part of FIG. 8, an expression for converting the position ($_{Ws}P_X$) in the world coordinate system (SLAM coordinate system) for the one point (x) in the three-dimensional space into the position ($_cP_X$) in the camera coordinate system can be shown by (Expression 1) below.

$$_cP_X = {_cT_{Ws}} \times {_{Ws}P_X} \qquad \text{(Expression 1)}$$

Here, the coordinate conversion matrix for converting the position ($_{Ws}P_X$) in the world coordinate system (SLAM coordinate system) into the position ($_cP_X$) in the camera coordinate system, that is, $_cT_{Ws}$ can be expressed by the following determinant (Expression 2).

[Math. 1]

$$_cT_{Ws} = \begin{bmatrix} _cR_{Ws} & -_cR_{Ws} \cdot {_{Ws}P_C} \\ 0 & 1 \end{bmatrix} \qquad \text{(Expression 2)}$$

Note that, in (Expression 2) above, $_cR_{Ws}$ denotes a rotation matrix for converting a posture defined in the world coordinate system (SLAM coordinate system) into a posture defined in the camera coordinate system, and $_{Ws}P_C$ denotes a camera position in the world coordinate system (SLAM coordinate system).

Note that the camera position corresponds to the position of the camera of the user terminal 10 in this embodiment.

Here, the coordinate conversion matrix CTWs in (Expression 2) above is a coordinate conversion matrix for converting the position (WsPX) in the world coordinate system (SLAM coordinate system) into the position (CPX) in the camera coordinate system.

As described above with reference to FIGS. 7A, 7B, and 7C, in the processing of the present disclosure, processing using the following three different coordinate systems is executed:

FIG. 7A Camera coordinate system

FIG. 7B NED coordinate system

FIG. 7C World coordinate system (SLAM coordinate system).

Figure 9:
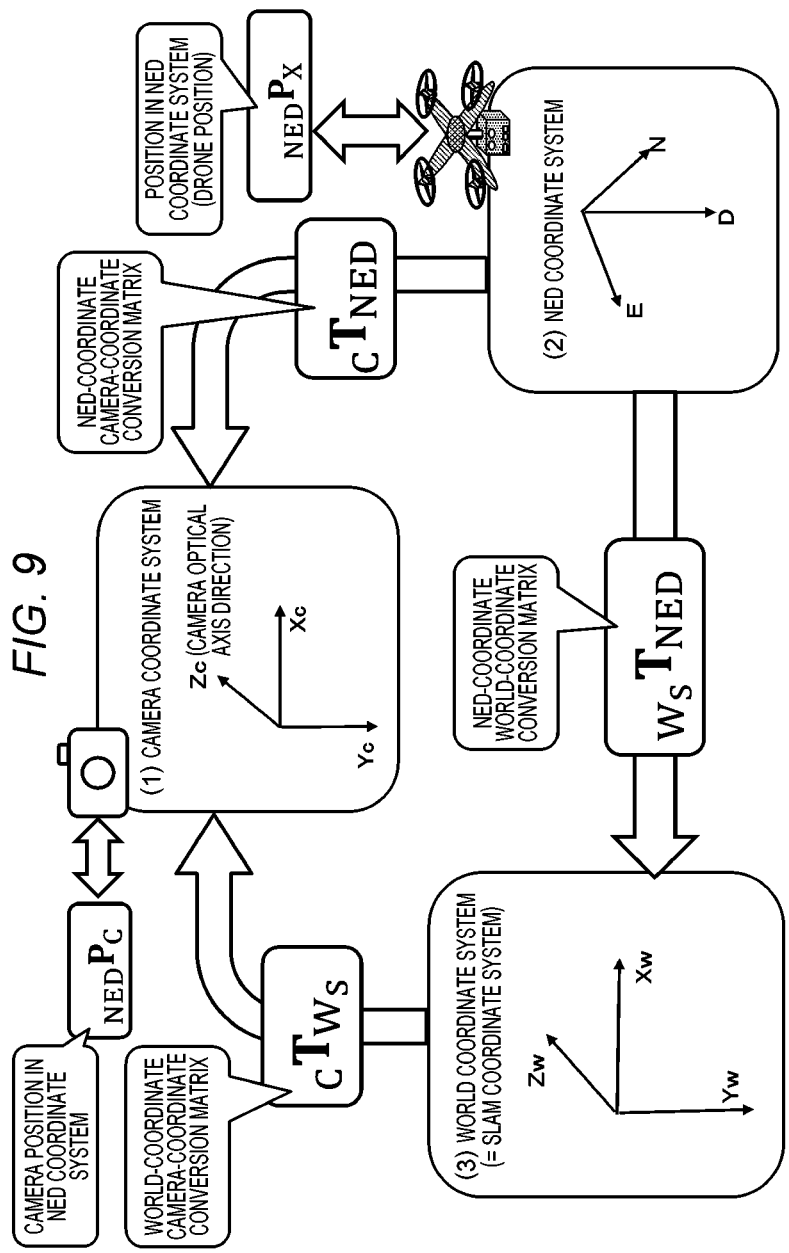
FIG. 9 illustrates an example of three coordinate conversion matrices.

FIG. 9 illustrates an example of coordinate conversion matrices of those three coordinate systems.

FIG. 9 illustrates the following three coordinate conversion matrices:

$_cT_{Ws}$: the coordinate conversion matrix for converting the position ($_{Ws}P_x$) in the world coordinate system (SLAM coordinate system) into the position ($_cP_x$) in the camera coordinate system, $_cT_{NED}$: a coordinate conversion matrix for converting a position ($_{NED}P_x$) in the NED coordinate system into the position ($_cP_x$) in the camera coordinate system, and $_{Ws}T_{NED}$: a coordinate conversion matrix for converting the position ($_{NED}P_x$) in the NED coordinate system into the position ($_{Ws}P_x$) in the world coordinate system (SLAM coordinate system).

Note that each of the three coordinate conversion matrices can be calculated from the other two coordinate conversion matrices. For example, the coordinate conversion matrix $_{Ws}T_{NED}$ for converting the position ($_{NED}P_x$) in the NED coordinate system into the position ($_{Ws}P_x$) in the world coordinate system (SLAM coordinate system) can be calculated according to the following expression by using the other two coordinate conversion matrices ($_cT_{Ws}$, $_cT_{NED}$).

$$_{Ws}T_{NED} = {_cT_{Ws}}^{-1} \times {_cT_{NED}}$$

Note that $_cT_{Ws}^{-1}$ denotes an inverse matrix of $_cT_{Ws}$ and can be calculated from $_cT_{Ws}$.

Similarly to the above case, the coordinate conversion matrix $_cT_{Ws}$ for converting the position ($_{Ws}P_x$) in the world coordinate system (SLAM coordinate system) into the position ($_cP_x$) in the camera coordinate system can be calculated according to the following expression by using the other two coordinate conversion matrices ($_{Ws}T_{NED}$, $_cT_{NED}$).

$$_cT_{Ws} = {_cT_{NED}} \times {_{Ws}T_{NED}}^{-1}$$

Further, the coordinate conversion matrix $_cT_{NED}$ for converting the position ($_{NED}P_x$) in the NED coordinate system into the position ($_cP_x$) in the camera coordinate system can be calculated according to the following expression by using the other two coordinate conversion matrices ($_{Ws}T_{NED}$, $_cT_{Ws}$).

$$_cT_{NED} = {_cT_{Ws}} \times {_{Ws}T_{NED}}$$

As described above with reference to FIGS. 7A, 7B, and 7C, each pixel position (u, v) of the display image displayed on the display unit of the user terminal 10 corresponds one-to-one with the XY coordinates (Xc, Yc) in the camera coordinate system, and, if a position on the flight path indicated in the NED coordinate system can be converted into a position in the camera coordinate system, the path can be accurately output to the display image shown in the camera coordinate system.

That is, if the coordinate conversion matrix for converting the position ($_{NED}P_x$) in the NED coordinate system into the position ($_cP_x$) in the camera coordinate system, that is, $_cT_{NED}$ can be calculated, the flight path position indicated in the NED coordinate system can be converted into the position in the camera coordinate system. This makes it possible to accurately output the flight path of the drone to the display image shown in the camera coordinate system.

The user terminal 10 serving as the image processing device of the present disclosure calculates the coordinate conversion matrix: $_cT_{NED}$.

A specific example of processing of calculating the coordinate conversion matrix: $_cT_{NED}$ executed by the user terminal 10 serving as the image processing device of the present disclosure will be described with reference to FIG. 10.

Figure 10:
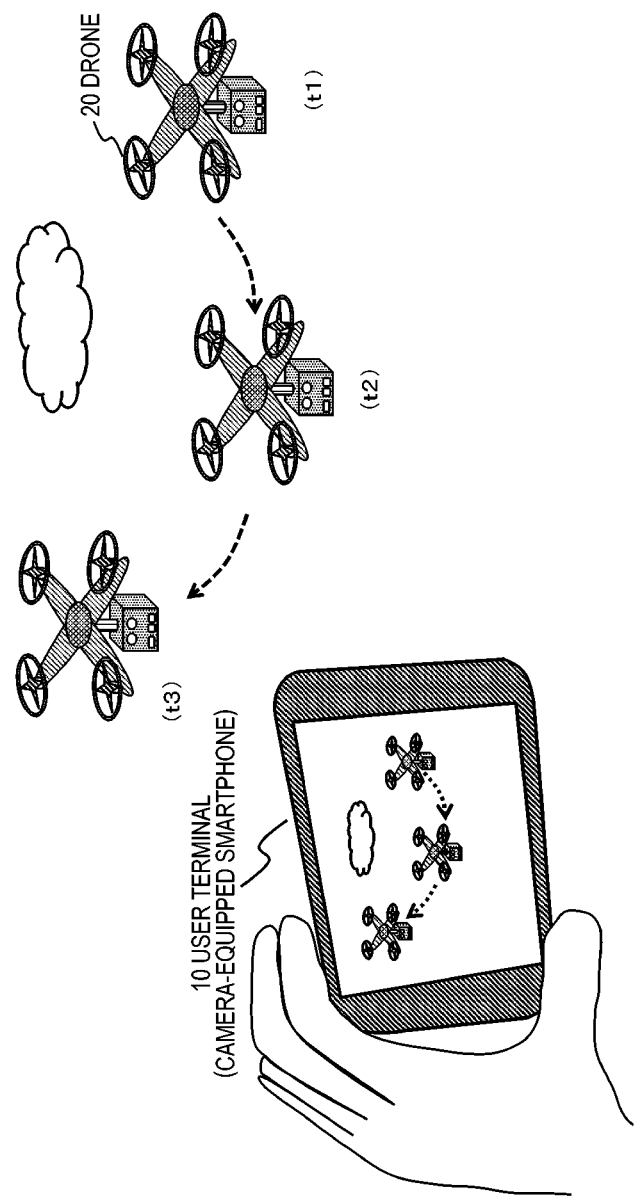
FIG. 10 illustrates a specific example of processing of calculating a coordinate conversion matrix (CTNED) executed by a user terminal serving as an image processing device of the present disclosure.

As illustrated in FIG. 10, the user captures an image of the drone 20 flying in the sky for a predetermined time by using the user terminal 10. The drone 20 may not be a drone carrying a package to be delivered to the user. However, the drone needs to be a drone capable of acquiring flight path position information (position information on the NED coordinates) of the drone.

In the example of FIG. 10, the drone 20 flies from right to left as time passes from a time (t1) through a time (t2) to a time (t3).

The data processing unit of the user terminal 10 records captured image positions of the drone at at least three different positions on a memory.

Figure 11:
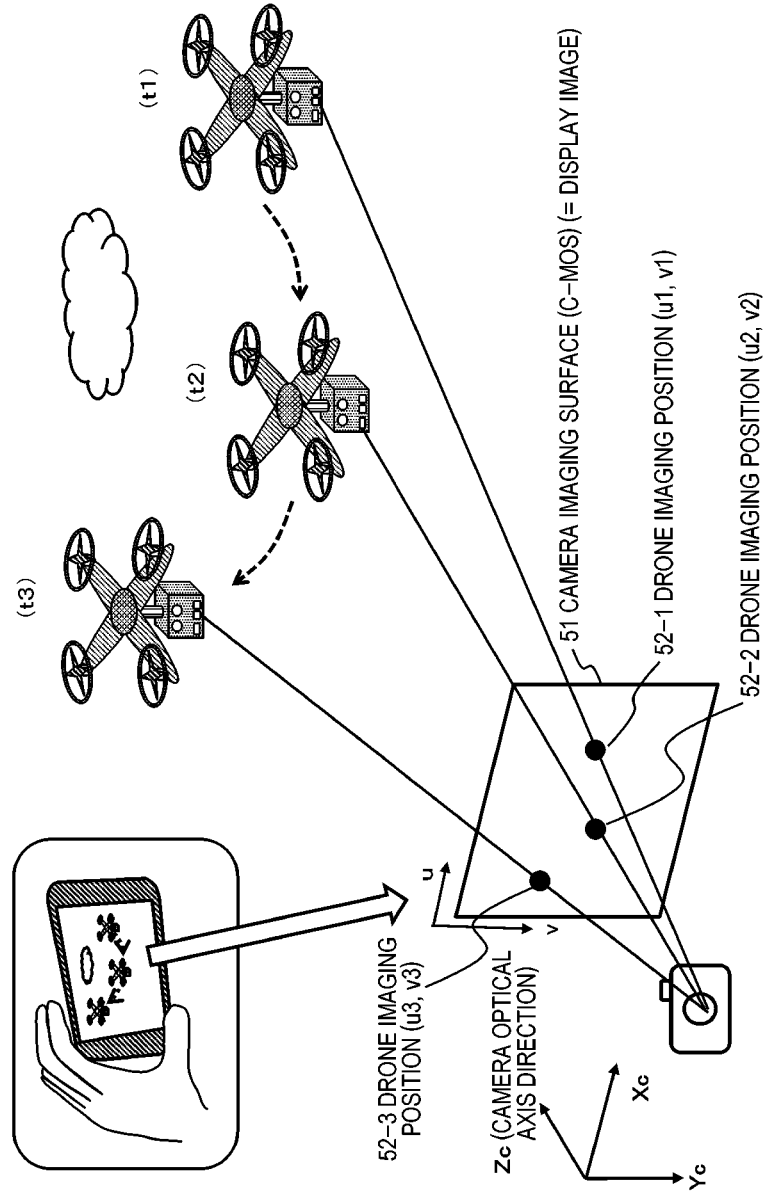
FIG. 11 illustrates a specific example of processing of calculating a coordinate conversion matrix (CTNED) executed by a user terminal serving as an image processing device of the present disclosure.

As illustrated in FIG. 11, the data processing unit records, on the memory, for example, drone imaging positions 52-1 to 52-3 corresponding to the drone at the three different positions on a camera imaging surface 51 such as a C-MOS.

Note that the drone imaging positions correspond to display image positions displayed on the display unit, and, here, a processing example using coordinate positions (u1, v1) to (u3, v3) on the display image is shown.

By using those three different drone positions and information regarding the three drone imaging positions corresponding to the three drone positions, it is possible to calculate the coordinate conversion matrix: $_cT_{NED}$.

Prior to specific description of the processing of calculating the coordinate conversion matrix ($_cT_{NED}$), a pinhole camera model will be described with reference to FIGS. 12 and 13. The pinhole camera model is a relational expression defining a relationship between a three-dimensional position M of an object obtained in a case where the object in a three-dimensional space is imaged by a general camera (pinhole camera) and an imaging position (imaging pixel position) m of the object on an imaging surface of the camera.

In the pinhole camera model, the relational expression between the three-dimensional position M of the object serving as an imaging subject and the imaging position (imaging pixel position) m of the object by the camera is shown by (Expression 3) below.

[Math. 2]

$$\lambda \tilde{m} = AR_w(M - C_w) \quad \text{(Expression 3)}$$

The meaning of (Expression 3) above will be described with reference to FIGS. 12 and 13.

Figure 12:
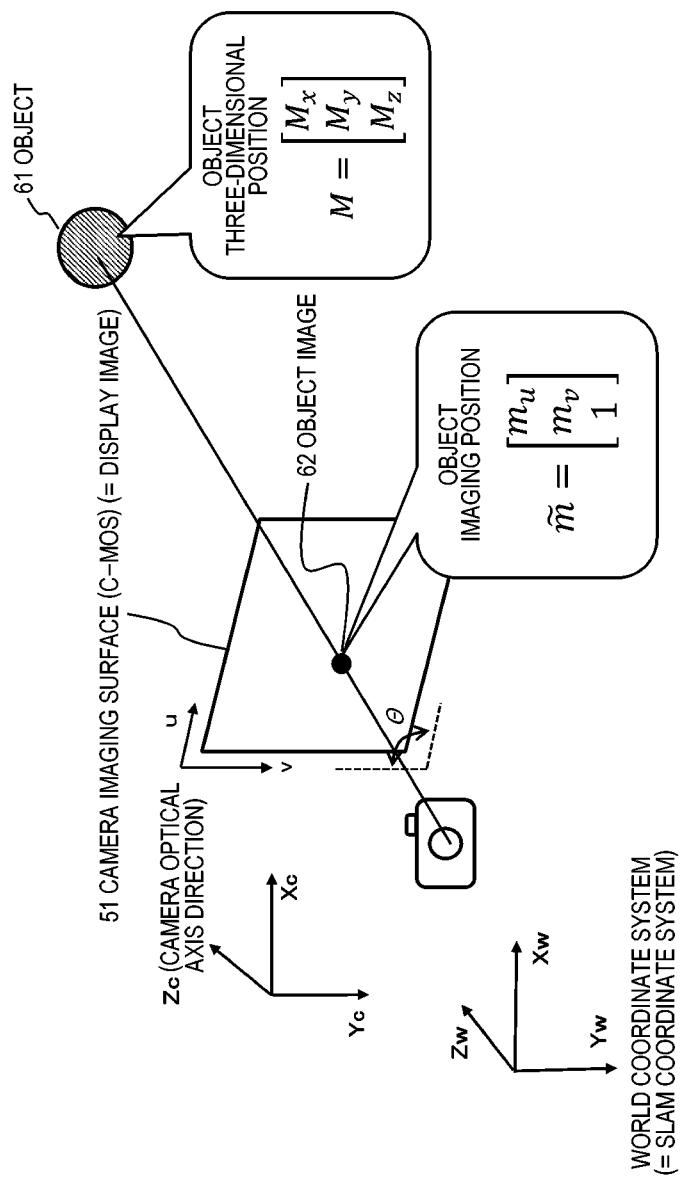
FIG. 12 illustrates a pinhole camera model.

As illustrated in FIG. 12, in a case where an object 61 serving as an imaging subject is imaged by the camera, an object image 62 is captured on the camera imaging surface (C-MOS or the like) 51 of the camera.

(Expression 3) above shows a correspondence between a pixel position in a camera-capturing image plane for the point (m) of the object image 62 included in the image captured by the camera, that is, a position expressed in the camera coordinate system and the three-dimensional position (M) of the object 61 in the world coordinate system.

The position (pixel position) of the point (m) of the object image 62 included in the camera-capturing image is expressed in the camera coordinate system. The camera coordinate system is a coordinate system in which a focal point of the camera serves as an origin C, an image plane is a two-dimensional plane of Xc and Yc, and an optical axis direction (depth) is Zc. The origin C moves as the camera moves.

Meanwhile, the three-dimensional position (M) of the object 61 serving as the imaging subject is indicated in the world coordinate system having three axes Xw, Yw, and Zw and having an origin O that does not move even if the camera moves. An expression showing a correspondence between the positions of the object in the different coordinate systems is defined as the pinhole camera model in (Expression 3) above.

Figure 13:
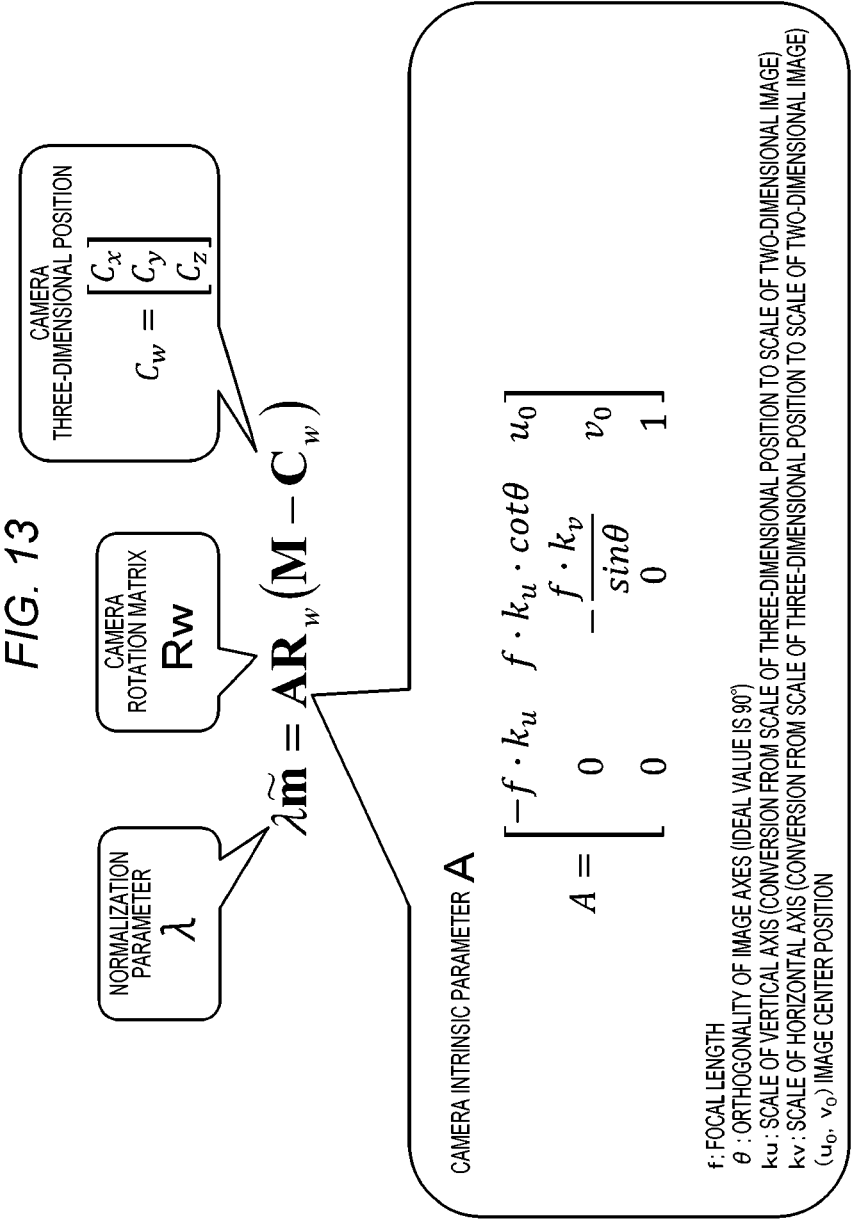
FIG. 13 illustrates a pinhole camera model.

As illustrated in FIG. 13, (Expression 3) includes the following parameters as values:
λ: normalization parameter,
A: camera intrinsic parameter,
Cw: camera position, and
Rw: camera rotation matrix.
Further,

[Math. 3]

$$\tilde{m} = \begin{bmatrix} m_u \\ m_v \\ 1 \end{bmatrix}$$

indicates a position on an imaging plane of the camera expressed in a homogeneous coordinate system.

The parameter λ is the normalization parameter, and is a value for satisfying a third term in $\tilde{m}$ [Math. 4]

and can be obtained by solving an equation.

Note that the camera intrinsic parameter A is the following determinant as shown in FIG. 13.

[Math. 5]

$$A = \begin{bmatrix} -f \cdot k_u & f \cdot k_u \cdot \cot\theta & u_0 \\ 0 & -\dfrac{f \cdot k_v}{\sin\theta} & v_0 \\ 0 & 0 & 1 \end{bmatrix}$$

The camera intrinsic parameter A includes the following values.
f: focal length
θ: orthogonality of image axes (ideal value is 90°)
$k_u$: scale of vertical axis (conversion from scale of three-dimensional position to scale of two-dimensional image)
$k_v$: scale of horizontal axis (conversion from scale of three-dimensional position into scale of two-dimensional image)
($u_0$, $v_0$): image center position
The following parameters:
Cw: camera position, and
Rw: camera rotation matrix,
which are included in (Expression 3) above, that is, (Expression 3) that is the relational expression between the three-dimensional position M of the object serving as the imaging subject and the imaging position (imaging pixel position) m of the object by the camera, can be acquired in the SLAM processing executed by the user terminal 10, that is, the simultaneous localization and mapping (SLAM) processing in which localization of a camera position and creation of an environment map (mapping) are executed in parallel.

The SLAM processing is processing of capturing images (moving image) by using a camera and analyzing trajectories of feature points included in the plurality of captured images, thereby estimating three-dimensional positions of the feature points and also estimating (localizing) a position and posture of the camera (self), and can create a surrounding map (environment map) (mapping) by using three-dimensional position information of the feature points. The processing of executing localization of the position of the camera (self) and creation of the surrounding map (environment map) (mapping) in parallel as described above is referred to as SLAM.

Note that one of the SLAM methods is EKF-based SLAM using an extended Kalman filter (EKF).

The EKF-based SLAM is a method of, for example, continuously capturing images while moving a camera, obtaining trajectories (tracking information) of feature points included in each image, and simultaneously estimating an amount of movement of the camera and three-dimensional positions of the feature points by a moving stereo method.

The EKF-based SLAM processing uses, for example, "state data" including multidimensional normal distribution data as a probability distribution model including the following pieces of information:
the position, the posture, a velocity, and an angular velocity of the camera; and
position information of each feature point. Update processing of the "state data" is performed by using the Kalman filter or extended Kalman filter to estimate the positions of the feature points, the position of the camera, and the like.

The "state data" includes multidimensional normal distribution data including an average vector and a variance-covariance matrix indicating the position, posture, velocity, and angular velocity of the camera and the position information of each feature point. The variance-covariance matrix includes [variance] of the position, posture, velocity, and angular velocity of the camera, the position information of each feature point, and eigenstate values thereof and [covariance] corresponding to correlation information regarding combinations of different state values of each of the above state values.

Among the following parameters included in (Expression 3) above, that is,
$\lambda$: normalization parameter
A: camera intrinsic parameter,
Cw: camera position, and
Rw: camera rotation matrix,
$\lambda$ and A are known, and Cw and Rw can be calculated by SLAM.

By using those parameters, it is possible to generate the relational expression between the three-dimensional position M of the object serving as the imaging subject and the imaging position (imaging pixel position) m of the object by the camera, that is, (Expression 3) above. Therefore, it is possible to analyze the correspondence between the three-dimensional position M of the object serving as the imaging subject indicated in the world coordinate system and the object imaging position indicated in the camera coordinate system.

(Expression 3) above shows a positional relationship between
(1) the object position (M) indicated in the world coordinate system, and
(2) the object imaging position (m) indicated in the camera coordinate system,
that is, points (M. m) in the two different coordinate systems of the world coordinate system and the camera coordinate system. The relational expression in (Expression 3) is not limited to the combination of the world coordinate system and the camera coordinate system and can also be developed as a relational expression showing a positional relationship between two points (M. m) of other combinations of two different coordinate systems.

Specifically, for example, the relational expression can also be developed as an expression showing a positional relationship between
(1) the object position (M) indicated in the NED coordinate system, and
(2) the object imaging position (m) indicated in the camera coordinate system,
that is, points (M. m) in two different coordinate systems of the NED coordinate system and the camera coordinate system.

The relational expression in this case, that is, the relational expression showing the positional relationship between
(1) the object position (M) indicated in the NED coordinate system, and
(2) the object imaging position (m) indicated in the camera coordinate system,
that is, points (M. m) in two different coordinate systems of the NED coordinate system and the camera coordinate system can be shown by (Expression 4) below.

[Math. 6]

$$\lambda \tilde{m} = A R_{NED}(M_{NED} - C_{NED}) \qquad \text{(Expression 4)}$$

(Expression 4) above corresponds to an expression in which the following parameters for the world coordinate system in (Expression 3) above, that is,
Rw: camera rotation matrix,
M: object position, and
Cw: camera position,
are changed to parameters for the NED coordinate system.

That is, the expression is obtained by changing the above parameters to the following parameters for the NED coordinate system:
$R_{NED}$: camera rotation matrix,
$M_{NED}$: object position, and
$C_{NED}$: camera position.

The relational expression in (Expression 4) is an expression defining a correspondence between the object position in the NED coordinate system and the object imaging position in the camera coordinate system that is the object imaging position in the imaging element when the object is imaged by the camera.

By using this relational expression, it is possible to calculate the coordinate conversion matrix $_{c}T_{NED}$ for converting the position ($_{NED}P_X$) in the NED coordinate system into the position ($_{c}P_X$) in the camera coordinate system.

As described above with reference to FIGS. 7A, 7B, and 7C, each pixel position (u, v) of the display image displayed on the display unit of the user terminal 10 corresponds one-to-one with the XY coordinates (Xc, Yc) in the camera coordinate system, and, if a position on the flight path indicated in the NED coordinate system can be converted into a position in the camera coordinate system, the path can be accurately output to the display image shown in the camera coordinate system.

A specific example of the processing of calculating the coordinate conversion matrix $_cT_{NED}$ for converting the position $(_{NED}P_X)$ in the NED coordinate system into the position $(_cP_X)$ in the camera coordinate system will be described.

Figures 14A, 14B:
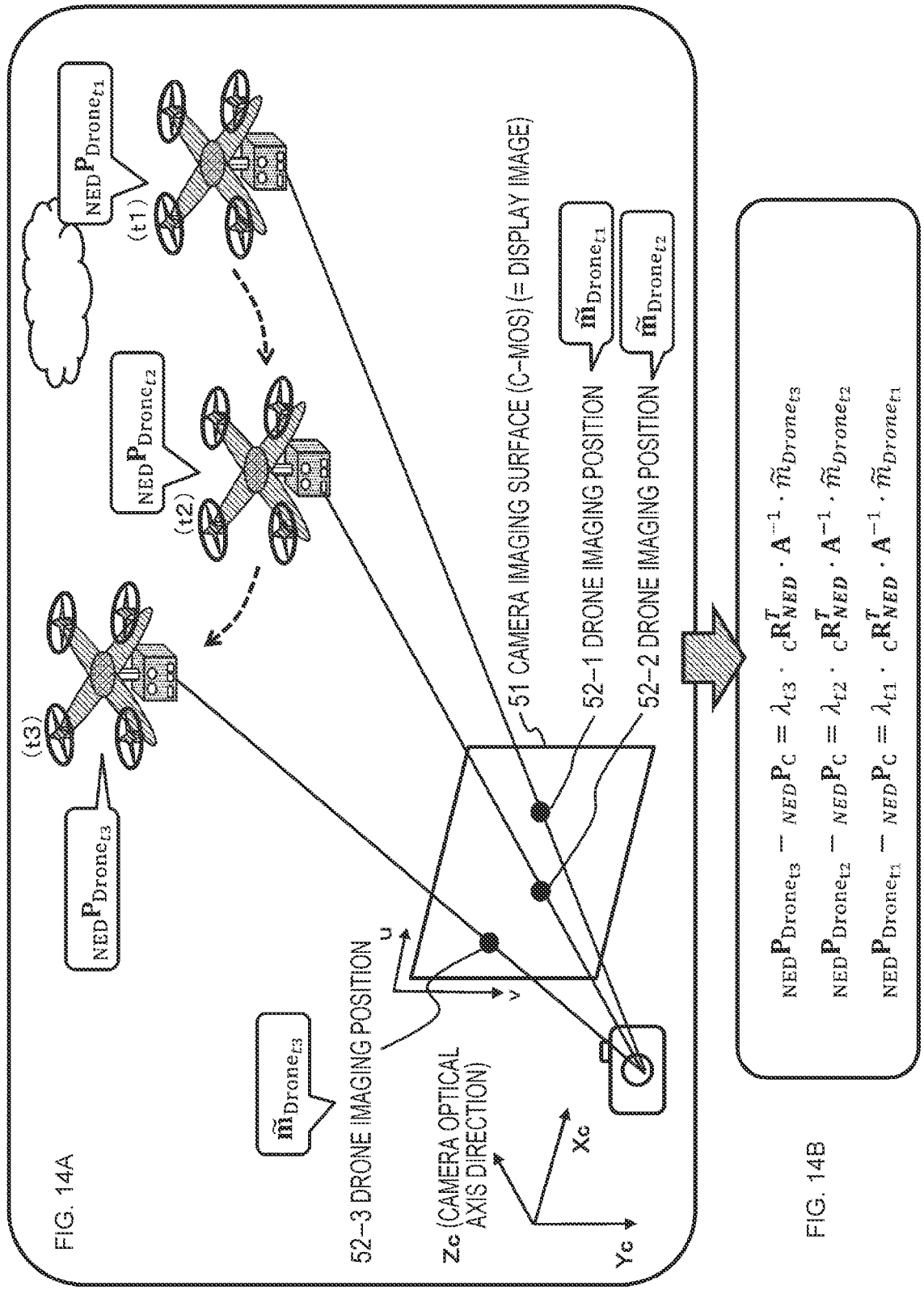
FIGS. 14A and 14B illustrate a specific example of processing of calculating a coordinate conversion matrix (CTNED) executed by a user terminal serving as an image processing device of the present disclosure.

FIG. 14A is similar to FIGS. 10 and 11 described above. The user captures an image of the drone 20 flying in the sky for a predetermined time by using the user terminal 10. The drone 20 may not be a drone carrying a package to be delivered to the user. However, the drone needs to be a drone capable of acquiring flight path position information (position information on the NED coordinates) of the drone.

In the example of FIG. 14A, the drone 20 flies from right to left as time passes from the time (t1) through the time (t2) to the time (t3).

The data processing unit of the user terminal 10 records captured image positions of the drone at at least three different positions on the memory.

As illustrated in FIGS. 14A and 14B, the data processing unit records, on the memory, for example, the drone imaging positions 52-1 to 52-3 corresponding to the drone at the three different positions on the camera imaging surface 51 such as a C-MOS.

The drone positions in the NED coordinate system at the times (t1), (t2), and (t3) are indicated as follows:
the drone position at the time (t1)=$_{NED}P_{Drone t1}$,
the drone position at the time (t2)=$_{NED}P_{Drone t2}$, and
the drone position at the time (t3)=$_{NED}P_{Drone t3}$.

Further, the imaging positions in the camera coordinate system at the times (t1), (t2), and (t3) are indicated as follows:
the drone imaging position at the time (t1)=$m_{Drone t1}$,
the drone imaging position at the time (t2)=$m_{Drone t2}$, and
the drone imaging position at the time (t3)=$m_{Drone t3}$.

Note that (˜) above m is omitted in the above description. Those drone imaging positions are position information in the camera coordinate system indicated in a three-dimensional homogeneous coordinate system.

When (Expression 4) above, that is, (Expression 4) defining the correspondence between the object position in the NED coordinate system and the object imaging position in the camera coordinate system that is the object imaging position in the imaging element when the object is imaged by the camera is shown by using the following parameters:
the drone position $_{NED}P_{Drone}$ in the NED coordinate system,
the camera position $_{NED}P_C$ in the NED coordinate system, and
the drone imaging position in the camera coordinate system=$m_{Drone}$,
(Expression 4) can be expressed by (Expression 5) below.

[Math. 7]

$$\lambda \tilde{m}_{Drone} = A \ _cR_{NED}(_{NED}P_{Drone} - _{NED}P_C) \quad \text{(Expression 5)}$$

Further, (Expression 6) below is derived on the basis of (Expression 5) above.

[Math. 8]

$$_{NED}P_{Drone} - _{NED}P_C = \lambda \cdot _cR_{NED}^T \cdot A^{-1} \cdot \tilde{m}_{Drone} \quad \text{(Expression 6)}$$

Note that
$_cR_{NED}^T$ denotes a transposed matrix of a rotation matrix: $_cR_{NED}$ for converting the NED coordinate system into the camera coordinate system.
$A^{-1}$ denotes an inverse matrix of the camera intrinsic parameter A described above with reference to FIG. 13.

When the three different drone positions in the NED coordinate system at the times (t1) to (t3) in FIGS. 14A and 14B and the drone imaging positions in the camera coordinate system corresponding to those drone positions are substituted into (Expression 6) above, simultaneous equations including three expressions in (Expression 7) below are obtained.

[Math. 9]

$$_{NED}P_{Drone t3} - _{NED}P_C = \lambda_{t3} \cdot _cR_{NED}^T \cdot A^{-1} \cdot \tilde{m}_{Drone t3}$$

$$_{NED}P_{Drone t2} - _{NED}P_C = \lambda_{t2} \cdot _cR_{NED}^T \cdot A^{-1} \cdot \tilde{m}_{Drone t2}$$

$$_{NED}P_{Drone t1} - _{NED}P_C = \lambda_{t1} \cdot _cR_{NED}^T \cdot A^{-1} \cdot \tilde{m}_{Drone t1} \quad \text{Expression 7)}$$

In the simultaneous equations in (Expression 7) above, each parameter below is known.

The drone position in the NED coordinate system: $_{NED}P_{Drone}$ can be acquired from the drone or the drone management server.

The inverse matrix $A^{-1}$ of the camera intrinsic parameter A is known.

The drone imaging positions at the times (t1) to (t3)=$m_{Drone t1}$ to $m_{Drone t3}$ are coordinate position information of a camera imaging system and can be acquired by analyzing images captured by the camera.

Therefore, unknown parameters in the simultaneous equations in (Expression 7) above are the following parameters:
the camera position in the NED coordinate system: $_{NED}P_C$,
the transposed matrix: $_cR_{NED}^T$ of the rotation matrix: $_cR_{NED}$ for converting the NED coordinate system into the camera coordinate system, and
normalization coefficients: $\lambda_{t1}, \lambda_{t2}, \lambda_{t3}$.

Here, the unknown parameters in the simultaneous equations in (Expression 7) above are the following nine parameters (three position elements, three posture elements, and three normalization coefficients):
the camera position in the NED coordinate system: $_{NED}P_C$,
the transposed matrix: $_cR_{NED}^T$ of the rotation matrix: $_cR_{NED}$ for converting the NED coordinate system into the camera coordinate system, and
the normalization coefficients: $\lambda_{t1}, \lambda_{t2}, \lambda_{t3}$.

It is possible to calculate values of those parameters by solving the simultaneous equations including the three expressions (amount of information is nine).

By using the values of the calculated parameters, as illustrated in FIGS. 15A, 15B, and 15C, it is possible to calculate the coordinate conversion matrix (CTNED) for converting the position (NEDPX) in the NED coordinate system into the position (CPX) in the camera coordinate system.

The coordinate conversion matrix (CTNED) in FIG. 15C, that is, the coordinate conversion matrix (CTNED) for converting the position (NEDPX) in the NED coordinate system into the position (CPX) in the camera coordinate system is a matrix in which, among matrix elements in the coordinate conversion matrix (CTNED) for converting the position (NEDPX) in the NED coordinate system into the position (CPX) in the camera coordinate system described above with reference to FIG. 8, elements in the world coordinate system are replaced with elements in the NED coordinate system.

That is, the coordinate conversion matrix $(_cT_{NED})$ for converting the position $(_{NED}P_X)$ in the NED coordinate system into the position ($_CP_X$) in the camera coordinate system can be shown by (Expression 8) below.

[Math. 10]

$$_CT_{NED} = \begin{bmatrix} _CR_{NED} & -_CR_{NED} \cdot _{NED}P_C \\ 0 & 1 \end{bmatrix} \quad \text{(Expression 8)}$$

Matrix elements of the coordinate conversion matrix ($_CT_{NED}$) in (Expression 8) above are formed by the parameters obtained by solving the simultaneous equations in (Expression 7) above.

Therefore, by solving the simultaneous equations in (Expression 7) above, it is possible to calculate the coordinate conversion matrix ($_CT_{NED}$) for converting the position ($_{NED}P_X$) in the NED coordinate system into the position ($_CP_X$) in the camera coordinate system.

As described above, the user terminal 10 serving as the image processing device of the present disclosure first acquires the three different drone positions in the NED coordinate system at the times (t1) to (t3) in FIGS. 14A and 15A and the drone imaging positions in the camera coordinate system corresponding to those drone positions.

Next, the following unknown parameters are acquired by solving the simultaneous equations in (Expression 7) above:
the camera position in the NED coordinate system: $_{NED}P_C$, and
the transposed matrix: $_CR^T_{NED}$ of the rotation matrix: $_CR_{NED}$ for converting the NED coordinate system into the camera coordinate system.

Next, the calculated parameters are used to generate the coordinate conversion matrix ($_CT_{NED}$), that is, the coordinate conversion matrix ($_CT_{NED}$) for converting the position ($_{NED}P_X$) in the NED coordinate system into the position ($_CP_X$) in the camera coordinate system.

By using the coordinate conversion matrix ($_CT_{NED}$), it is possible to convert a position on the flight path indicated in the NED coordinate system into a position indicated in the camera coordinate system.

As described above with reference to FIGS. 3 and 5, the user terminal 10 serving as the image processing device of the present disclosure can acquire the flight path information indicated in the NED coordinate system from the drone 20 or the drone management server 30 serving as the control center that performs control and the like of the drone 20.

The user terminal 10 can apply the coordinate conversion matrix $_CT_{NED}$ in (Expression 8) above to the acquired flight path information indicated in the NED coordinate system, thereby acquiring the flight path position indicated in the camera coordinate system, and outputs the acquired flight path position (flight path or scheduled flight path) indicated in the camera coordinate system to an actually captured image, that is, an image including the real image of the drone.

As a result, as illustrated in FIG. 16, it is possible to output and display the flight path (flight path or scheduled flight path) of the drone with no deviation with respect to a drone image serving as the actually captured image.

An image display example of FIG. 16 is an AR image display example executed by the user terminal 10 serving as the image processing device of the present disclosure, which is an example where the flight path (flight path or scheduled flight path) of the drone is output and displayed with no deviation with respect to the drone image serving as the actually captured image.

Note that the above-described processing is based on the assumption that the position and posture of the camera are unchanged during a period of imaging the drone at the three different positions, that is, during a drone imaging time from the times (t1) to (t3) in FIGS. 14A and 15A.

In a case where the position and posture of the camera are changed during the period of imaging the drone at the three different positions, the processing needs to be performed in consideration of the change in the position and posture of the camera.

Hereinafter, this processing example will be described with reference to FIGS. 17A and 17B.

In a case where the position and posture of the camera change during the period of imaging the drone, as illustrated in FIG. 17A, positions and postures of the camera imaging the drone 20 at different positions are different.

In the example of FIG. 17A, an imaging surface of the camera that images the drone at the time (t1) is a camera imaging surface 51(t1), and an imaging surface of the camera that images the drone at the time (t2) is a camera imaging surface 51(t2). Those camera imaging surfaces are in different positions and postures.

Here, a coordinate conversion matrix for converting the world coordinate system (SLAM coordinate system) into the camera coordinate system at the time (t1) is defined as ($_{Ct1}T_{Ws}$).

Further, a coordinate conversion matrix for converting the world coordinate system (SLAM coordinate system) into the camera coordinate system at the time (t2) is defined as ($_{Ct2}T_{Ws}$).

Note that a coordinate conversion matrix ($_{Ctn}T_{Ws}$) for converting the world coordinate system (SLAM coordinate system) into the camera coordinate system at a time (tn) is a matrix corresponding in time (n) to the coordinate conversion matrix ($_CT_{Ws}$) for converting the position ($_{Ws}P_X$) in the world coordinate system (SLAM coordinate system) for the one point (x) in the three-dimensional space into the position ($_CP_X$) in the camera coordinate system described above with reference to FIG. 8.

Matrix elements included in the coordinate conversion matrix ($_{Ctn}T_{Ws}$) for converting the world coordinate system into the camera coordinate system at the time (tn) can be acquired in the SLAM processing executed by the user terminal 10, that is, the simultaneous localization and mapping (SLAM) processing in which localization of a camera position and creation of an environment map (mapping) are executed in parallel.

Therefore, the coordinate conversion matrix (CtnTWs) at the time (tn) such as the coordinate conversion matrix (Ct1TWs) for converting the world coordinate system (SLAM coordinate system) into the camera coordinate system at the time (t1), and the coordinate conversion matrix (Ct2TWs) for converting the world coordinate system (SLAM coordinate system) into the camera coordinate system at the time (t2) shown in FIGS. 17A and 17B can be calculated by the SLAM processing.

Further, a coordinate conversion matrix for converting the camera coordinate system at the time (t1) into the camera coordinate system at the time (t2) is ($_{Ct2}T_{Ct1}$) and can be calculated from the following expression.

$$_{Ct2}T_{Ct1} = {_{Ct2}T_{Ws}} \times {_{Ct1}T_{Ws}}^{-1}$$

The user terminal 10 serving as the image processing device of the present disclosure performs coordinate conversion in which the above coordinate conversion matrix: $_{Ct2}T_{Ct1}$ is applied to the drone imaging position on the imaging surface of the camera at the time (t1) at which the drone at the time (t1) is imaged. By this coordinate conversion, the drone imaging position in the camera coordinate system at the time (t1) is converted into a drone imaging position in the camera coordinate system at the time (t2).

Further, the position of the drone to be converted into the imaging surface of the camera at the time (t1), $_{NED}P'_{Drone t1}$ can be expressed by the following expression.

$$_{NED}P'_{Drone t1} = {}_{NED}P_{Drone t1} + ({}_{Ct2}R^T{}_{NED}) \cdot ({}_{Ct2}R_{Ct1}) \cdot ({}_{Ct1}P_{Ct2})$$

As a result, the drone imaging positions on the two different camera coordinate systems can be converted into drone imaging positions according to one common camera coordinate system.

Regarding drone imaging positions corresponding to three different drone positions, it is possible to set drone imaging positions corresponding to the three different drone positions on one common camera coordinate system by performing the above processing.

Figures 18A, 18B, 18C:
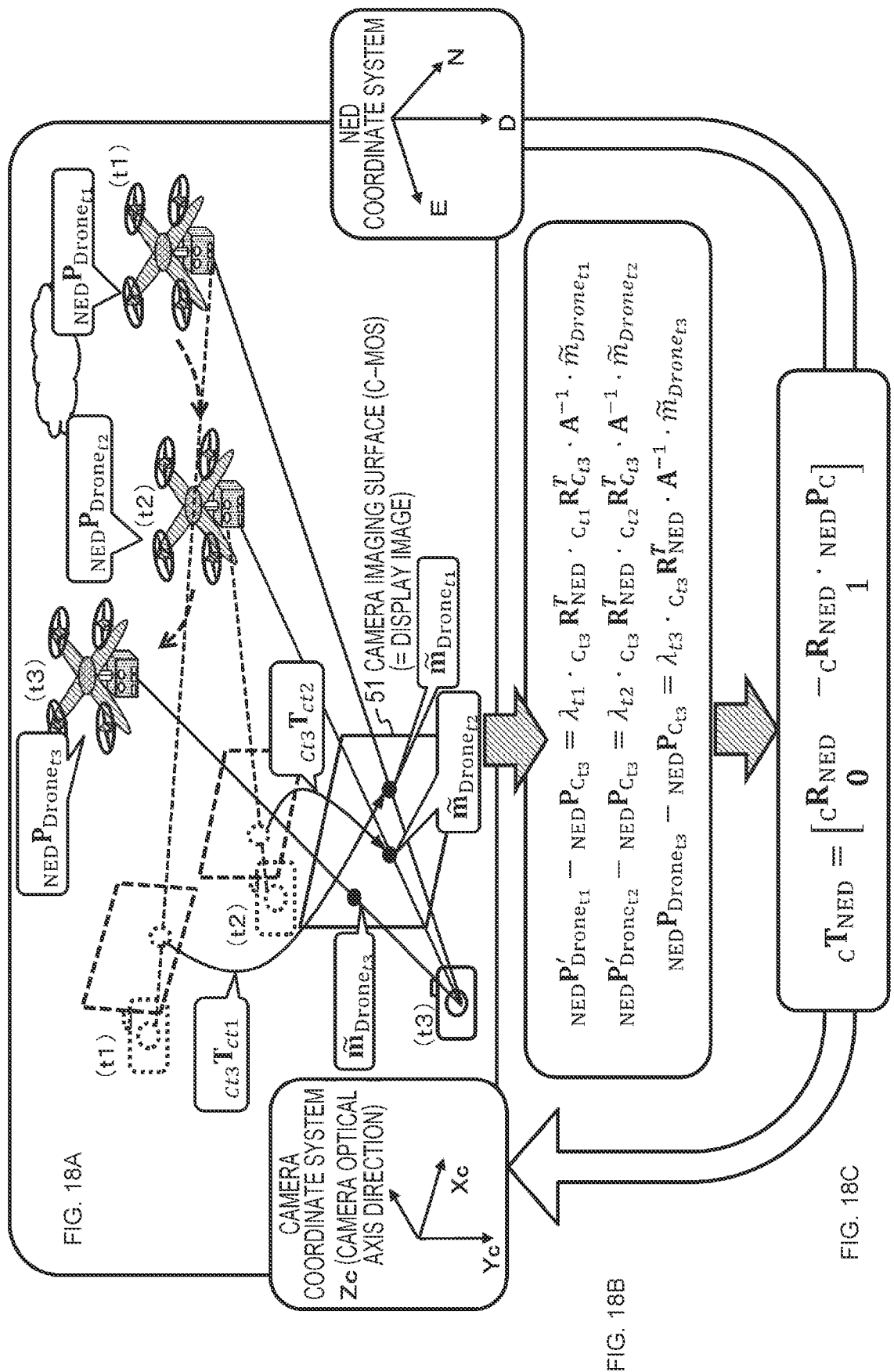
FIGS. 18A, 18B, and 18C illustrate processing in which a change in a position and posture of a camera during an imaging period of a drone at three different positions is considered.

FIG. 18A illustrates an example where the camera that images the drone at three different positions is in different positions and postures.

As illustrated in FIG. 18A, the camera (user terminal 10) is in different positions and postures at the times (t1), (t2), and (t3), and the camera in different positions and postures images the drone 20 at the times (t1), (t2), and (t3), respectively.

The flight path and scheduled flight path of the drone 20 are output at the latest time (t3). In this case, the data processing unit of the user terminal 10 executes the following processing:

(1) establishing an equation for performing coordinate conversion in which a coordinate conversion matrix $({}_{Ct3}T_{Ct1})$ is applied to the drone imaging position at the time (t1); and (2) establishing an equation for performing coordinate conversion in which a coordinate conversion matrix $({}_{Ct3}T_{Ct2})$ is applied to the drone imaging position at the time (t2).

By the above coordinate conversion processing, the drone imaging positions in the camera coordinate systems at the times (t1) and (t2) are converted into drone imaging positions in the camera coordinate system at the time (t3).

By establishing those equations, it is possible to establish simultaneous equations for setting drone imaging positions corresponding to three different drone positions on one common camera coordinate system (the camera coordinate system at the time (t3)).

That is, it is possible to establish simultaneous equations for setting the following three drone imaging positions on one common camera coordinate system (the camera coordinate system at the time (t3)):

the drone imaging position at the time (t1)=$m_{Drone t1}$,
the drone imaging position at the time (t2)=$m_{Drone t2}$, and
the drone imaging position at the time (t3)=$m_{Drone 3}$.

Note that ($\tilde{\ }$) above m is omitted in the above description. Those drone imaging positions are position information in the camera coordinate system indicated in a three-dimensional homogeneous coordinate system.

Thereafter, processing similar to the processing described above with reference to FIGS. 14A, 14B, 15A, 15B, and 15C are executed.

First, as shown in FIG. 18B, simultaneous equations including correspondence equations between the above drone imaging positions=mDronet1 to mDronet3 at the times (t1) to (t3) and the drone positions in the NED coordinate system, that is, the simultaneous equations in (Expression 7) above are generated.

Next, the parameters obtained by solving the simultaneous equations are used to calculate the coordinate conversion matrix (CTNED) in FIG. 18C, that is, the coordinate conversion matrix (CTNED) for converting the position (NEDPX) in the NED coordinate system into the position (CPX) in the camera coordinate system.

By using the coordinate conversion matrix (CTNED), the position on the flight path indicated in the NED coordinate system is converted into the position indicated in the camera coordinate system, and the acquired flight path position (flight path or scheduled flight path) indicated in the camera coordinate system is output to an actually captured image, that is, an image including the real image of the drone.

Note that, in the example of FIGS. 18A, 18B, and 18C, the flight path position (flight path or scheduled flight path) is output to the camera-capturing image at the time (t3).

Note that, thereafter, in a case where the flight path position (flight path or scheduled flight path) is continuously output at times (t4), (t5), . . . , it is only necessary to continuously execute the above-described processing.

In a case where the flight path position (flight path or scheduled flight path) is output to a camera-capturing image at the time (t4), simultaneous equations including correspondence equations between the drone imaging positions=$m_{Dronet2}$ to $m_{Dronet4}$ at the times (t2), (t3), and (t4) and the drone positions in the NED coordinate system, that is, the simultaneous equations in (Expression 7) above are generated.

In a case where the flight path position (flight path or scheduled flight path) is output to a camera-capturing image at the time (t5), simultaneous equations including correspondence equations between the drone imaging positions=$m_{Dronet3}$ to $m_{Dronet5}$ at the times (t3), (t4), and (t5) and the drone positions in the NED coordinate system, that is, the simultaneous equations in (Expression 7) above are generated.

Hereinafter, if similar processing is continuously executed, the flight path position (flight path or scheduled flight path) on the camera-capturing image also moves as the camera is moved. Therefore, an accurate flight path is continuously output.

[3. Sequence of Processing Executed by Image Processing Device of Present Disclosure]

Next, a sequence of processing executed by the image processing device of the present disclosure will be described.

Figure 19:
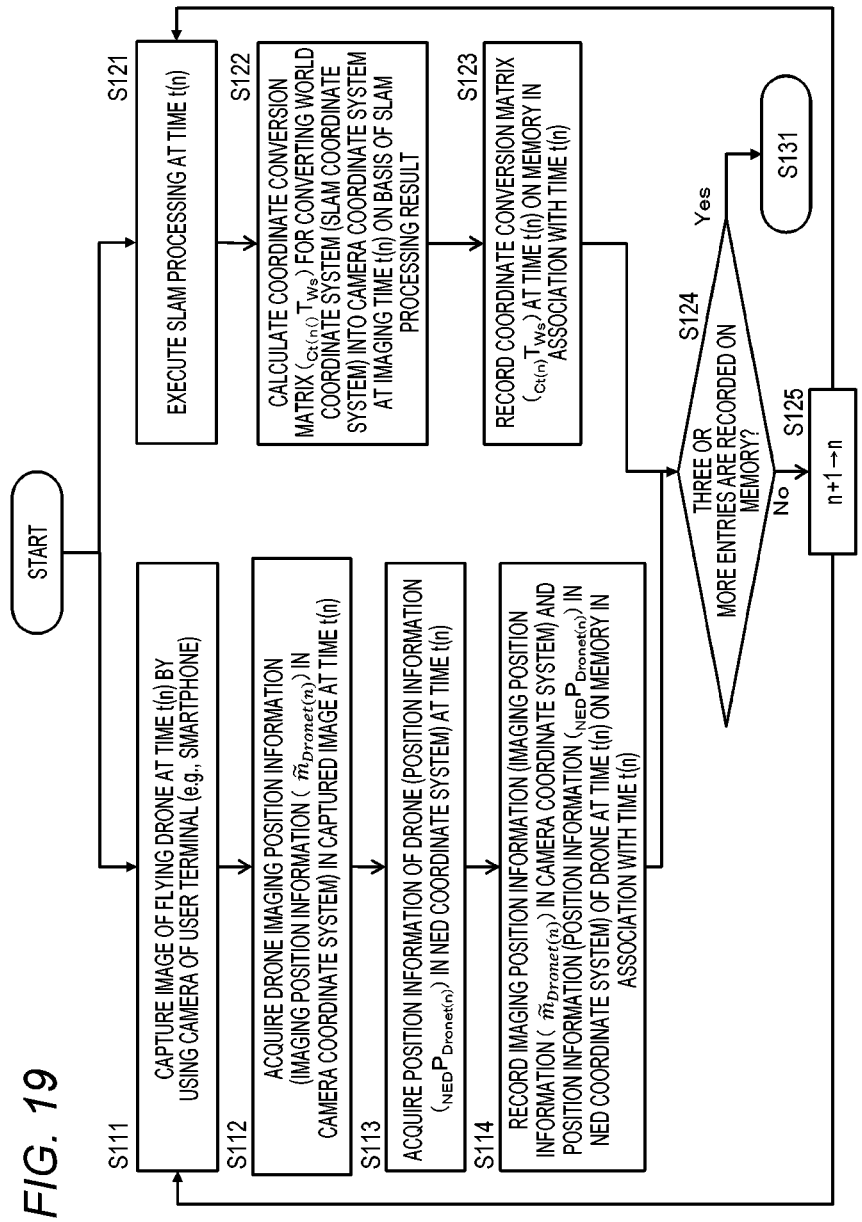

Flowcharts in FIG. 19 and subsequent drawings show a processing sequence executed by the image processing device of the present disclosure, for example, the user terminal 10 such as a smartphone.

Processing according to the flow shown in FIG. 19 and the subsequent drawings can be executed under the control of a control unit (data processing unit) including a CPU or the like having a program execution function of the image processing device in accordance with a program stored in the memory inside the image processing device.

Hereinafter, processes in the respective steps in the flow shown in FIG. 19 and the subsequent drawings will be described in order.

Note that processes in steps S111 to S114 and processes in steps S121 to S123 in FIG. 19 can be executed in parallel.

First, the processes in steps S111 to S114 will be described.

(Step S111)

The process in step S111 is a process of capturing an image of a drone in the sky by using the user terminal 10.

The image of the flying drone 20 is captured at the time t(n) by using, for example, the camera of the user terminal 10 such as a smartphone.

That is, the image of the flying drone 20 is captured as described above with reference to FIGS. 10 and 11.

As illustrated in FIG. 10, the user captures an image of the drone 20 flying in the sky for a predetermined time by using the user terminal 10. The drone 20 may not be a drone carrying a package to be delivered to the user. However, the drone needs to be a drone capable of acquiring flight path position information (position information on the NED coordinates) of the drone.

(Step S112)

Next, in step S112, the user terminal 10 acquires drone imaging position information (imaging position information $(m_{Dronet(n)})$ in the camera coordinate system) in the captured image at the time t(n). Note that (˜) above m is omitted in the description.

The drone imaging position is an imaging position indicated in the camera coordinate system (homogeneous coordinate system) at the time t(n).

(Step S113)

Next, in step S113, the user terminal 10 acquires position information of the drone (position information $(_{NED}P_{Dronet(n)})$ in the NED coordinate system) at the time t(n).

As described above with reference to FIGS. 3 and 5, the user terminal 10 serving as the image processing device of the present disclosure can acquire flight path information indicated in the NED coordinate system from the drone 20 or the drone management server 30 such as the control center that performs control and the like of the drone 20.

(Step S114)

Next, in step S114, the user terminal 10 records the imaging position information (imaging position information $(m_{Dronet(n)})$ in the camera coordinate system) and the position information (position information $(_{NED}P_{Dronet(n)})$ in the NED coordinate system) of the drone at the time t(n) on the memory in association with the time t(n).

Next, the processes in steps S121 to S123 executed in parallel with the processes in steps S111 to S114 will be described.

(Step S121)

The user terminal 10 executes the following process in step S121.

The user terminal executes the SLAM processing at the time t(n), that is, at the timing of capturing the image of the drone in step S111.

As described above, the SLAM processing is processing in which localization of a camera position and creation of an environment map (mapping) are executed in parallel.

(Step S122)

Next, in step S122, the user terminal 10 calculates a coordinate conversion matrix $(_{Ct(n)}T_{Ws})$ for converting the world coordinate system (SLAM coordinate system) into the camera coordinate system at the imaging time t(n) on the basis of the SLAM processing result in step S121.

The process in step S122 corresponds to the processing described above with reference to FIG. 17A.

(Step S123)

Next, in step S123, the user terminal 10 records, on the memory, the coordinate conversion matrix $(_{Ct(n)}T_{Ws})$ calculated in step S122, that is, the coordinate conversion matrix $(_{Ct(n)}T_{Ws})$ for converting the world coordinate system (SLAM coordinate system) into the camera coordinate system at the imaging time t(n).

When the processes in steps S111 to S114 and the processes in steps S121 to S123 are completed, a process in step S124 is executed.

(Step S124)

In step S124, the user terminal 10 determines whether or not there are three or more entries recorded on the memory.

That is, it is determined whether or not data based on captured images at three different drone positions is recorded on the memory.

An example of specific recorded data recorded on the memory will be described with reference to FIG. 20.

FIG. 20 shows an example where data based on captured images at three different drone positions is recorded.

As shown in FIG. 20, entries corresponding to imaging times (e.g., t(n)) of the drone in the sky are recorded on the memory. In each entry, the following data is recorded as data corresponding to the drone imaging time.

(1) The time (t)(=drone imaging time)
(2) The drone imaging position in the camera coordinate system
(3) The drone position in the NED coordinate system
(4) The coordinate conversion matrix for converting the world coordinate system (SLAM coordinate system) into the camera coordinate system "(2) The drone imaging position in the camera coordinate system" is the drone imaging position information (e.g., the imaging position information $(m_{Dronet(n)})$ in the camera coordinate system) in the captured image acquired in step S112 in the flow of FIG. 19.

"(3) The drone position in the NED coordinate system" is the position information of the drone in the sky (position information (e.g., $_{NED}P_{Dronet(n)}$) in the NED coordinate system) at an image capturing timing acquired in step S113 in the flow of FIG. 19.

"(4) The coordinate conversion matrix for converting the world coordinate system (SLAM coordinate system) into the camera coordinate system" is the coordinate conversion matrix (e.g., $_{Ct(n)}T_{Ws}$) for converting the world coordinate system (SLAM coordinate system) into the camera coordinate system at the imaging time calculated in step S122 in the flow of FIG. 19.

In each entry corresponding to the imaging time in the memory, the above data corresponding to the drone imaging time is recorded.

In step S124 in the flowchart of FIG. 19, it is determined whether or not there are three or more entries recorded on the memory.

That is, it is determined whether or not data based on captured images at three different drone positions is recorded on the memory.

In a case where the data based on the captured images at the three different drone positions is recorded on the memory as shown in FIG. 20, the processing proceeds to the next step S131.

Meanwhile, in a case where the data based on the captured images at the three different drone positions is not recorded on the memory, the determination in step S124 is No, and the processing proceeds to step S125.

(Step S125)

In step S125, a time setting parameter n is set to the next time n+1, and the processes in steps S111 to S114 and the processes in steps S121 to S123 are executed at the next time (n+1).

That is, the drone located at a position different from the position at the time (n) is imaged at the time (n+1), and the processing is executed.

(Step S131)

In step S124, in a case where it is determined that the data based on the captured images at the three different drone positions is recorded on the memory as shown in FIG. 20, the processing proceeds to step S131.

As shown in FIG. 21, the user terminal 10 executes the following process in step S131.

A coordinate conversion matrix (e.g., Ct(out)TCt(n)) for converting the camera coordinate system at the drone imaging time into the camera coordinate system at a time t(out) at which the drone flight path is output is calculated and is recorded on the memory.

This process corresponds to the processing described above with reference to FIGS. 17A and 17B.

An example of the coordinate conversion matrix (e.g., $_{Ct(out)}T_{Ct(n)}$) recorded on the memory will be described with reference to FIG. 22.

Data recorded on the memory in step S131 is data of (5) shown in FIG. 22, that is, data of (5) the coordinate conversion matrix for converting the camera coordinate system at the time of imaging the drone into the camera coordinate system at the time of outputting the flight path.

Note that, in the example of FIG. 22, the time=t(n+2) is set as the drone flight path output time t(out) among the entries corresponding to the three imaging times in FIG. 22.

That is, $t(n+2)=t(\text{out})$ is satisfied.

In this case, as shown in FIG. 22, coordinate conversion matrices additionally recorded as "(5) the coordinate conversion matrix for converting the camera coordinate system at the time of imaging the drone into the camera coordinate system at the time of outputting the flight path" are only coordinate conversion matrices at the imaging time=t(n) and the imaging time=t(n+1).

Regarding the data at the imaging time=t(n+2), no coordinate conversion matrix needs to be additionally recorded because the camera coordinate system at the time of imaging the drone matches with the camera coordinate system at the time of outputting the flight path.

For the entry at the imaging time=t(n), the coordinate conversion matrix for converting the camera coordinate system (Ct(n)) at the time of imaging the drone (t=(n)) into the camera coordinate system (Ct (out)) at the time of outputting the flight path, that is, $_{Ct(out)}T_{Ct(n)}$ is added.

Further, for the entry at the imaging time=t(n+1), the coordinate conversion matrix for converting the camera coordinate system (Ct(n+1)) at the time of imaging the drone (t=(n+1)) into the camera coordinate system (Ct(out)) at the time of outputting the flight path, that is, $_{Ct(out)}T_{Ct(n+1)}$ is added.

(Step S132)

As shown in the flow of FIG. 21, next, the user terminal 10 executes the following process in step S132.

The user terminal performs coordinate conversion processing to which a coordinate conversion matrix ($_{Ctc}T_{Ctn}$) is applied on the drone imaging position in the camera coordinate system at the drone imaging time, calculates a drone imaging position corresponding to the camera coordinate system at the drone flight path output time t(out), and records the drone imaging position on the memory.

This process corresponds to the processing described above with reference to FIGS. 17A, 17B, and 18A.

An example of the drone imaging position corresponding to the camera coordinate system at the drone flight path output time t(out) recorded on the memory will be described with reference to FIG. 22.

Data recorded on the memory in step S132 is data of (6) shown in FIG. 22, that is, data of (6) the drone imaging position corresponding to the camera coordinate system at the drone flight path output time t(out).

Note that, in the example of FIG. 22, the time=t(n+2) is set as the time t(out) at which the drone flight path is output among the entries corresponding to the three imaging times in FIG. 22.

That is, $t(n+2)=t(\text{out})$ is satisfied.

In this case, in step S132, the user terminal 10 calculates the following data and records the data on the memory.

Processing to be performed on the data at the drone imaging time=t(n) is as follows.

Coordinate conversion processing to which the coordinate conversion matrix ($_{Ct(out)}T_{Ct(n)}$) is applied is performed on the drone imaging position ($m_{Dronet(n)}$) in the camera coordinate system ($C_{t(n)}$) at the drone imaging time=t(n). That is, the following coordinate conversion processing is performed.

$\lambda(m_{Dronem})=A\cdot(_{Ctout}T_{NED})\cdot(_{NED}P_{Dronem})$

Coordinates acquired from the above equation indicate the drone imaging position corresponding to the camera coordinate system at the drone flight path output time t(out). This coordinate position is recorded on the memory.

Further, processing to be performed on the data at the drone imaging time=t(n+1) is as follows.

Coordinate conversion processing to which the coordinate conversion matrix ($_{Ct(out)}T_{Ct(n+1)}$) is applied is performed on the drone imaging position ($m_{Dronet(n+1)}$) in the camera coordinate system ($C_{t(n+1)}$) at the drone imaging time=t(n+1). That is, the following coordinate conversion processing is performed.

$\lambda(m_{Dronem+1})=A\cdot(_{Ctout}T_{NED})\cdot(_{NED}P_{Dronem+1})$

Coordinates acquired from the above equation indicate the drone imaging position corresponding to the camera coordinate system at the drone flight path output time t(out). This coordinate position is recorded on the memory.

Further, processing to be performed on the data at the drone imaging time=t(n+2) is as follows.

The camera coordinate system ($C_{t(n+2)}$) at the drone imaging time=t(n+2) matches with the camera coordinate system ($C_{t(out)}$) at the drone flight path output time t(out). Therefore, the coordinate conversion is unnecessary, and the drone imaging position ($m_{Dronet(n+2)}$) in the camera coordinate system ($C_{t(n+2)}$) at the drone imaging time=t(n+2) is recorded as it is on the memory.

The above recorded data is data recorded in the item (6) of FIG. 22.

Figure 23:
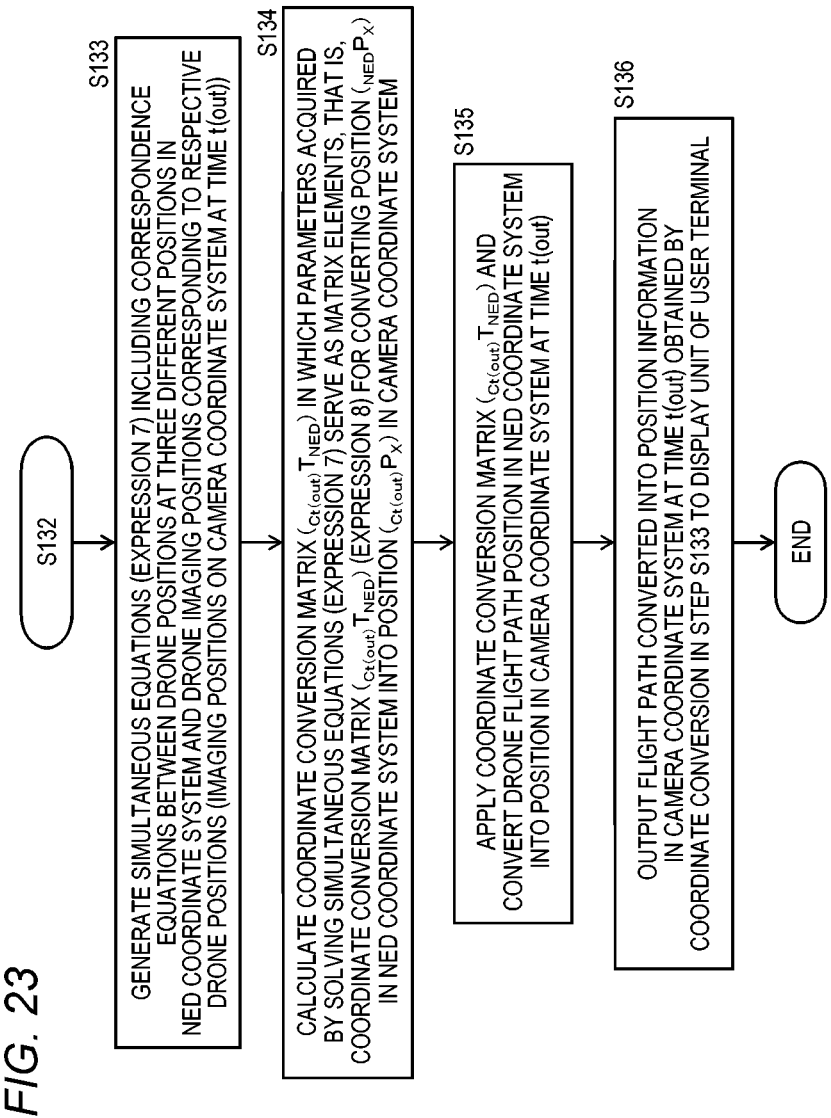

Next, processes in step S133 and subsequent steps in a flow of FIG. 23 will be described.

(Step S133)

The user terminal 10 executes the following process in step S133.

The user terminal generates the simultaneous equations (Expression 7) including the correspondence equations between the drone positions at the three different positions in the NED coordinate system recorded on the memory and the drone imaging positions corresponding to the respective drone positions (imaging positions on the camera coordinate system at the time t(out)).

The generated simultaneous equations are the simultaneous equations described above with reference to FIGS. 14B, 15B, and 18B and are the simultaneous equations described above as (Expression 7).

Note that, as the drone imaging positions (mDronetn) included in the three equations forming the simultaneous equations in (Expression 7), the positions calculated in step S132, that is, the drone imaging positions corresponding to the camera coordinate system at the drone flight path output time t(out) are used.

That is, the converted coordinate positions recorded in the item (6) of the memory recorded data described with reference to FIG. 22 are used.

(Step S134)

Next, in step S134, the user terminal 10 calculates a coordinate conversion matrix ($_{Ct(out)}T_{NED}$) in which parameters acquired by solving the simultaneous equations (Expression 7) generated in step S133 serve as matrix elements, that is, the coordinate conversion matrix ($_{Ct(out)}T_{NED}$) (Expression 8) for converting the position ($_{NED}P_X$) in the NED coordinate system into a position ($_{Ct(out)}P_X$) in the camera coordinate system.

This coordinate conversion matrix (Ct(out)TNED) corresponds to the coordinate conversion matrix (CTNED) described above with reference to FIGS. 15C and 18C and also corresponds to the coordinate conversion matrix (CTNED) described above as (Expression 8).

(Step S135)

Next, in step S135, the user terminal 10 applies the coordinate conversion matrix ($_{Ct(out)}T_{NED}$) generated in step S134 and converts a drone flight path position in the NED coordinate system into a position in the camera coordinate system.

Note that the drone flight path (flown path or scheduled flight path) in the NED coordinate system is acquired from the drone 20 or the drone management server 30.

(Step S136)

Next, in step S136, the user terminal 10 outputs the flight path converted into position information in the camera coordinate system obtained by the coordinate conversion in step S135 to the display unit of the user terminal.

By performing the above processing, it is possible to accurately display the path information of the drone on the captured image of the drone.

That is, as illustrated in FIG. 16 described above, it is possible to output and display the flight path (flight path or scheduled flight path) of the drone with no deviation with respect to the drone image serving as the actually captured image.

[4. Configuration Example of Image Processing Device of Present Disclosure and Drone]

Next, a configuration example of the image processing device of the present disclosure and a drone will be described.

Figure 24:
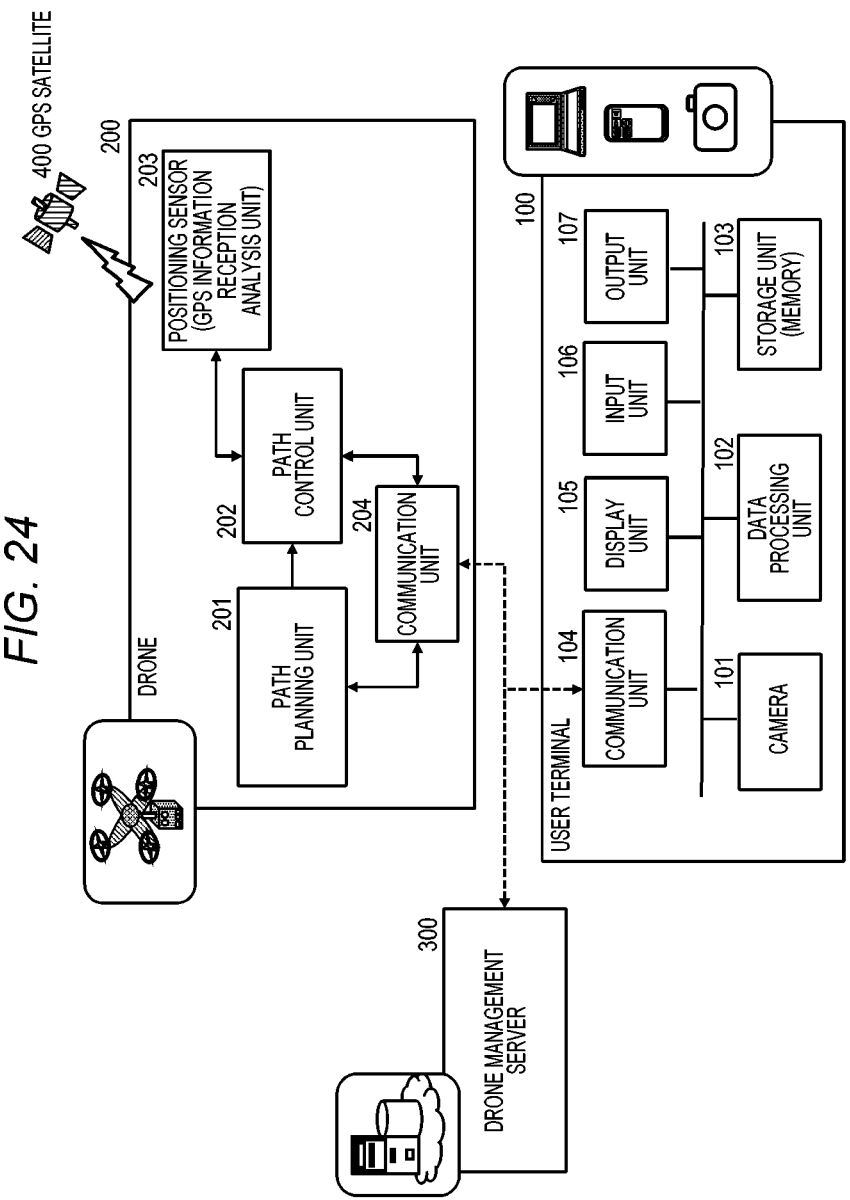

FIG. 24 illustrates a configuration example of a user terminal 100 serving as the image processing device of the present disclosure and a drone 200.

The user terminal 100 serving as the image processing device of the present disclosure is, for example, a camera-equipped communication terminal such as a smartphone. The user terminal is not limited to the smartphone and may be a device such as a PC or a camera device.

The user terminal 100 has a configuration capable of communicating with the drone 200 and a drone management server 300.

The drone 200 flies according to a predefined flight path by using, for example, communication information with the drone management server 300 or communication information with a GPS satellite 400.

As illustrated in FIG. 24, the user terminal 100 includes a camera 101, a data processing unit 102, a storage unit (memory) 103, a communication unit 104, a display unit 105, an input unit 106, and an output unit 107.

The camera 101 is used for, for example, processing of imaging the drone or capturing an image at the time of the SLAM processing.

The data processing unit 102 performs output control of a flight path of the drone described above. That is, the data processing unit performs, for example, processing of generating an AR image in which the flight path is superimposed on a real image of the drone or the like and displaying the AR image on the display unit 105.

Further, the data processing unit controls processing executed in the user terminal 100, such as the SLAM processing and image capturing control.

The data processing unit 102 includes, for example, a processor such as a CPU having a program execution function and executes processing in accordance with a program stored in the storage unit 103.

The storage unit (memory) 103 is used as a storage area and a work area of the program executed by the data processing unit 102. The storage unit (memory) is also used as a storage area for various parameters applied to the processing. The storage unit (memory) 103 includes a RAM, a ROM, and the like.

The communication unit 104 communicates with the drone 200 and the drone management server 300. For example, the communication unit performs, for example, processing of receiving flight path information of the drone 200 from the drone 200 or the drone management server 300.

The display unit 105 displays a camera-capturing image and further outputs the flight path information of the drone generated by the data processing unit 102. That is, the display unit displays the AR image in which the flight path is superimposed on the real image of the drone or the like.

The input unit 106 is an operation unit performed by the user and is used for various kinds of processing, for example, input processing requested by the user such as image capturing, start and end of path display, and the like.

The output unit 107 includes a sound output unit, an image output unit, and the like.

Next, a configuration of the drone 200 will be described.

The drone 200 includes a path planning unit 201, a path control unit 202, a positioning sensor (GPS information reception analysis unit) 203, and a communication unit 204.

The path planning unit 201 plans and determines a flight path of the drone 200. For example, the path planning unit plans and determines a specific flight path on the basis of information received from the drone management server 300.

The path control unit 202 executes flight control for causing the drone 200 to fly according to the flight path determined by the path planning unit 201.

The positioning sensor (GPS information reception analysis unit) 203 communicates with the GPS satellite 400, analyzes a current position (latitude, longitude, and altitude) of the drone 200 on the basis of the communication information with the GPS satellite 400, and outputs the analysis information to the path control unit 202.

The path control unit 202 refers to the input information from the positioning sensor (GPS information reception analysis unit) 203 and executes flight control for causing the drone 200 to fly according to the flight path determined by the path planning unit 201.

The communication unit 204 communicates with the drone management server 300 and the user terminal 100.

Note that the processing example of displaying the flight path of the drone has been described in the above-described embodiment. However, the processing of the present disclosure is not limited to display of the flight path of the drone and is also applicable to processing of displaying path information of other moving objects such as a robot and an autonomous vehicle, for example.

Similar processing can be performed by replacing the drone in the above-described embodiment with the robot or the autonomous vehicle.

[5. Summary of Configurations of Present Disclosure]

Hereinabove, the embodiments of the present disclosure have been described in detail by referring to specific embodiments. However, it is obvious that those skilled in the art can make modifications and substitutions of the embodiments, without departing from the scope of the present disclosure. That is, the present invention has been described in the form of illustration, and should not be interpreted in a limited manner. The claims should be taken into consideration in order to determine the gist of the present disclosure.

Note that the technology disclosed in this specification can be configured as follows.

(1) An image processing device including
a data processing unit that displays a moving path of a moving device on a display unit that displays a camera-capturing image of the moving device, in which
the data processing unit
executes coordinate conversion processing of converting position information according to a first coordinate system indicating the moving path of the moving device into a second coordinate system capable of specifying a pixel position of a display image on the display unit, and
outputs, to the display unit, the moving path having position information according to the second coordinate system generated by the coordinate conversion processing.

(2) An image processing method executed in an image processing device, in which:
the image processing device includes a data processing unit that displays a moving path of a moving device on a display unit that displays a camera-capturing image of the moving device; and
the data processing unit
executes coordinate conversion processing of converting position information according to a first coordinate system indicating the moving path of the moving device into a second coordinate system capable of specifying a pixel position of a display image on the display unit, and
outputs, to the display unit, the moving path having position information according to the second coordinate system generated by the coordinate conversion processing.

(3) The image processing method according to (2), in which:
the moving device is a drone;
the first coordinate system is an NED coordinate system; and
the second coordinate system is a camera coordinate system corresponding to a camera that has captured the image of the moving device.

(4) The image processing method according to (2) or (3), in which
the data processing unit
generates a relational expression showing a correspondence between a position of the moving device corresponding to the first coordinate system and an imaging position of the moving device in the captured image, and
generates a coordinate conversion matrix to be applied to the coordinate conversion processing by using a parameter calculated from the generated relational expression.

(5) The image processing method according to any one of (2) to (4), in which
the data processing unit
generates simultaneous equations including a relational expression showing a correspondence between a position of the moving device corresponding to the first coordinate system and an imaging position of the moving device in the captured image, and
generates a coordinate conversion matrix to be applied to the coordinate conversion processing by using a parameter calculated from the generated simultaneous equations.

(6) The image processing method according to (5), in which
the data processing unit
generates the simultaneous equations by using camera-capturing images of the moving device at a plurality of different positions.

(7) The image processing method according to (5) or (6), in which
the data processing unit
generates a coordinate conversion matrix in which the parameter obtained from the simultaneous equations is set as a matrix element of the coordinate conversion matrix.

(8) The image processing method according to any one of (5) to (7), in which
the data processing unit
generates the simultaneous equations including three relational expressions by using camera-capturing images of the moving device at three different positions.

(9) The image processing method according to any one of (6) to (8), in which
in a case where the camera captures the camera-capturing images of the moving device at the plurality of different positions in different positions or postures,
the data processing unit executes processing of calculating a coordinate conversion matrix for converting a plurality of different camera coordinates at the time of capturing the images into one camera coordinate, applying the calculated camera coordinate conversion matrix, and setting imaging positions of the moving device at the plurality of different positions on the one camera coordinate.

(10) The image processing method according to (9), in which
the data processing unit
executes simultaneous localization and mapping (SLAM) processing of calculating the position and posture of the camera that captures an image of the moving device and calculates the camera coordinate conversion matrix by using a result of the SLAM processing.

(11) The image processing method according to (10), in which
the data processing unit
calculates a world-coordinate camera-coordinate conversion matrix for performing coordinate conversion between a world coordinate system that is a coordinate system applied to the SLAM processing and a camera coordinate system corresponding to the camera on the basis of the result of the SLAM processing, and
applies the calculated world-coordinate camera-coordinate conversion matrix and calculates the camera coordinate conversion matrix for converting the plurality of different camera coordinates at the time of capturing the images into the one camera coordinate.

(12) The image processing method according to any one of (2) to (11), in which
the data processing unit
acquires flight path information according to an NED coordinate system serving as the first coordinate system from a drone serving as the moving device or a drone management server that manages the drone, and
converts the acquired flight path information into a camera coordinate system serving as the second coordinate system.

(13) The image processing method according to any one of (2) to (12), in which
the data processing unit
displays a moved path and a scheduled moving path of the moving device on the display unit that displays the camera-capturing image of the moving device.

(14) A program for causing an image processing device to execute image processing, in which:
the image processing device includes a data processing unit that displays a moving path of a moving device on a display unit that displays a camera-capturing image of the moving device; and
the program causes the data processing unit to execute
coordinate conversion processing of converting position information according to a first coordinate system indicating the moving path of the moving device into a second coordinate system capable of specifying a pixel position of a display image on the display unit, and
processing of outputting, to the display unit, the moving path having position information according to the second coordinate system generated by the coordinate conversion processing.

Further, the series of processes described in the specification can be executed by hardware, software, or a combined configuration of both. In a case where the processes are executed by software, the processes can be executed by installing a program in which the processing sequence is recorded in a memory inside a computer incorporated into dedicated hardware and executing the program, or by installing a program in a general purpose computer that can execute various processes and executing the program. For example, the program can be recorded on a recording medium in advance. The program can be installed in the computer from the recording medium, or can also be received via a network such as a local area network (LAN) or the Internet and be installed in a recording medium such as a built-in hard disk.

Note that the various processes described in the specification not only are executed in time series in accordance with the description, but also are executed in parallel or individually depending on a processing capacity of a device that executes the processes or as necessary. Further, in this specification, a system is a logical set configuration of a plurality of devices, and is not limited to a system in which devices having respective configurations are in the same housing.

INDUSTRIAL APPLICABILITY

As described above, an embodiment of the present disclosure realizes a configuration capable of accurately displaying a flight path of a drone on an actually captured image of the drone.

Specifically, for example, the configuration includes a data processing unit that displays a moving path of a moving device such as a drone on a display unit that displays a camera-capturing image of the moving device. The data processing unit generates a coordinate conversion matrix for performing coordinate conversion processing of converting position information according to a first coordinate system, for example, the NED coordinate system indicating the moving path of the moving device into a second coordinate system, for example, the camera coordinate system capable of specifying a pixel position of a display image on the display unit and outputs, to the display unit, the moving path having position information according to the camera coordinate system generated by coordinate conversion processing to which the generated coordinate conversion matrix is applied.

This configuration can accurately display a flight path of a drone on an actually captured image of the drone.

REFERENCE SIGNS LIST

10 User terminal
20 Drone
30 Drone management server
40 GPS satellite
51 Camera imaging surface
61 Object
62 Object image
100 User terminal
101 Camera
102 Data processing unit
103 Storage unit (memory)
104 Communication unit
105 Display unit
106 Input unit
107 Output unit
200 Drone
201 Path planning unit
202 Path control unit
203 Positioning sensor (GPS information reception analysis unit)
204 Communication unit
300 Drone management server
400 GPS satellite

The invention claimed is:

1. An image processing device, comprising:
a display unit configured to display a camera-capturing image of a plurality of camera-capturing images of a moving device, wherein the plurality of camera-capturing images corresponds to different positions of the moving device; and
a data processing unit configured to:
control the display unit to display a moving path of the moving device on the camera-capturing image of the moving device;
generate simultaneous equations including a relational expression that indicates a correspondence between a position of the moving device in a first coordinate system and an imaging position of the moving device in the camera-capturing image, wherein the generation of the simultaneous equations is based on the plurality of camera-capturing images corresponding to the different positions of the moving device;
calculate a parameter from the generated simultaneous equations;
generate a coordinate conversion matrix based on the calculated parameter;
convert, based on the coordinate conversion matrix, first position information in the first coordinate system into second position information in a second coordinate system, wherein
the first position information indicates the moving path of the moving device, and
the second coordinate system specifies a pixel position of a display image on the display unit; and
output, to the display unit, the moving path having the second position information in the second coordinate system.

2. An image processing method, comprising:
displaying, by a display unit of an image processing device, a camera-capturing image of a plurality of camera-capturing images of a moving device, wherein the plurality of camera-capturing images corresponds to different positions of the moving device;
controlling, by a data processing unit of the image processing device, the display unit to display a moving path of the moving device on the camera-capturing image of the moving device;
generating, by the data processing unit, simultaneous equations including a relational expression that indicates a correspondence between a position of the moving device in a first coordinate system and an imaging position of the moving device in the camera-capturing image, wherein the generation of the simultaneous equations is based on the plurality of camera-capturing images corresponding to the different positions of the moving device;
calculating, by the data processing unit, a parameter from the generated simultaneous equations;
generating, by the data processing unit, a coordinate conversion matrix based on the calculated parameter;
converting, by the data processing unit, based on the coordinate conversion matrix, first position information in the first coordinate system into second position information in a second coordinate system, wherein
the first position information indicates the moving path of the moving device, and
the second coordinate system specifies a pixel position of a display image on the display unit; and
outputting, to the display unit, the moving path having the second position information in the second coordinate system.

3. The image processing method according to claim 2, wherein
the moving device is a drone,
the first coordinate system is a north, east, and down (NED) coordinate system, and
the second coordinate system is a camera coordinate system corresponding to a camera that has captured the plurality of camera-capturing images of the moving device.

4. The image processing method according to claim 2, further comprising
setting, by the data processing unit, the parameter, calculated from the generated simultaneous equations, as a matrix element of the coordinate conversion matrix.

5. The image processing method according to claim 2, further comprising
generating, by the data processing unit, the simultaneous equations including three relational expressions based on the plurality of camera-capturing images of the moving device, wherein the plurality of camera-capturing images corresponds to three different positions of the moving device.

6. The image processing method according to claim 2, further comprising:
controlling a camera of the image processing device to capture the plurality of camera-capturing images of the moving device at the different positions;
calculating, by the data processing unit, the coordinate conversion matrix for converting a plurality of different camera coordinates at a time of capturing the plurality of camera-capturing images into one camera coordinate;
applying, by the data processing unit, the calculated coordinate conversion matrix; and
setting, by the data processing unit, imaging positions of the moving device at the different positions on the one camera coordinate.

7. The image processing method according to claim 6, further comprising:
executing, by the data processing unit, a simultaneous localization and mapping (SLAM) processing of calculating a position of the camera and a posture of the camera that captures the camera-capturing image of the moving device; and
calculating, by the data processing unit, the coordinate conversion matrix based on a result of the SLAM processing.

8. The image processing method according to claim 7, further comprising:
calculating, by the data processing unit, a world-coordinate camera-coordinate conversion matrix;
performing, by the data processing unit, based on the result of the SLAM processing, coordinate conversion between a world coordinate system and a camera coordinate system, wherein
the world coordinate system is a coordinate system applied to the SLAM processing, and
the camera coordinate system corresponds to the camera;
applying, by the data processing unit, the calculated world-coordinate camera-coordinate conversion matrix; and
calculating, by the data processing unit, the coordinate conversion matrix for converting the plurality of different camera coordinates at the time of capturing the plurality of camera-capturing images into the one camera coordinate.

9. The image processing method according to claim 2, further comprising:

acquiring, by the data processing unit, flight path information from one of the moving device or a drone management server, wherein the flight path information is in to a north, east, and down (NED) coordinate system, wherein
 the NED coordinate system is the first coordinate system, the moving device is a drone, and
 the drone is managed by the drone management server; and converting, by the data processing unit, the acquired flight path information into a camera coordinate system, wherein the camera coordinate system is the second coordinate system.

10. The image processing method according to claim 2, further comprising controlling, by the data processing unit, the display unit to display a moved path of the moving device and a scheduled moving path of the moving device on the camera-capturing image of the moving device.

11. A non-transitory computer-readable medium having stored thereon, computer-executable instructions which, when executed by an image processing device, cause the image processing device to execute operations, the operations comprising:

displaying, by a display unit of the image processing device, a camera-capturing image of a plurality of camera-capturing images of a moving device, wherein the plurality of camera-capturing images corresponds to different positions of the moving device;

controlling, by a data processing unit of the image processing device, the display unit to display a moving path of the moving device on the camera-capturing image of the moving device;

generating, by the data processing unit, simultaneous equations including a relational expression that indicates a correspondence between a position of the moving device in a first coordinate system and an imaging position of the moving device in the camera-capturing image, wherein the generation of the simultaneous equations is based on the plurality of camera-capturing images corresponding to the different positions of the moving device;

calculating, by the data processing unit, a parameter from the generated simultaneous equations;

generating, by the data processing unit, a coordinate conversion matrix based on the calculated parameter;

converting, by the data processing unit, based on the coordinate conversion matrix, first position information in the first coordinate system into second position information in a second coordinate system, wherein
 the first position information indicates the moving path of the moving device, and
 the second coordinate system specifies a pixel position of a display image on the display unit; and outputting, to the display unit, the moving path having the second position information in the second coordinate system.

\* \* \* \* \*